(12) United States Patent
Natesh et al.

(10) Patent No.: US 10,270,074 B2
(45) Date of Patent: Apr. 23, 2019

(54) BATTERY SEPARATORS COMPRISING CHEMICAL ADDITIVES AND/OR OTHER COMPONENTS

(71) Applicant: Hollingsworth & Vose Company, East Walpole, MA (US)

(72) Inventors: Gubbi Krishnappa Natesh, Vijayanagara (IN); Mahadevaswamy Kodimole Mahadevappa, Chamarajanagar (IN); Krishna Marchigowda, Karnataka (IN); Harish Moddegowdru Ramaswamy, Hinkal (IN); Akshay Ashirgade, Northborough, MA (US); Nicolas Clement, Littleton, MA (US); John A. Wertz, Hollis, NH (US); Richard O. Angus, Jr., Moosup, CT (US); Zhiping Jiang, Westford, MA (US)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

(21) Appl. No.: 15/552,328

(22) PCT Filed: Feb. 19, 2016

(86) PCT No.: PCT/US2016/018610
§ 371 (c)(1),
(2) Date: Aug. 21, 2017

(87) PCT Pub. No.: WO2016/134222
PCT Pub. Date: Aug. 25, 2016

(65) Prior Publication Data
US 2018/0047964 A1 Feb. 15, 2018

(30) Foreign Application Priority Data
Feb. 19, 2015 (IN) .............................. 483/DEL/2015

(51) Int. Cl.
*H01M 2/16* (2006.01)
*H01M 10/06* (2006.01)
(Continued)

(52) U.S. Cl.
CPC ........... *H01M 2/1613* (2013.01); *B32B 3/085* (2013.01); *B32B 3/26* (2013.01); *B32B 3/28* (2013.01);
(Continued)

(58) Field of Classification Search
CPC ............. H01M 2/1613; H01M 2/1633; H01M 2/1653; H01M 2/1686; H01M 2/1646;
(Continued)

(56) References Cited

U.S. PATENT DOCUMENTS 4,205,122 A 5/1980 Ichikura et al.
4,216,281 A * 8/1980 O'Rell ..................... D21H 5/12
429/252
(Continued)

FOREIGN PATENT DOCUMENTS

EP 0 466 302 A1 1/1992
EP 0 680 105 A1 11/1995
(Continued)

OTHER PUBLICATIONS

U.S. Appl. No. 15/510,339, filed Mar. 10, 2017, Natesh.
(Continued)

*Primary Examiner* — Cynthia K Walls
(74) *Attorney, Agent, or Firm* — Wolf, Greenfield & Sacks, P.C.

(57) ABSTRACT

Non-woven webs that can be used as battery separators for batteries, such as lead acid batteries, are generally provided. In some embodiments, battery separators comprising a non-woven web including one or more chemical additives are provided. The chemical additives may impart beneficial (Continued)

properties, such as enhanced separator stability and/or battery performance. In some embodiments, the chemical additive(s) may confer resistance to oxidation, heavy metal deposition, and/or formation of short circuits during cycling of a battery including the battery separator. The respective characteristics and/or amounts of the chemical additive(s) may be selected to impart desirable properties while having relatively minimal or no adverse effects on another property of the battery separator and/or the battery.

27 Claims, 6 Drawing Sheets

(51) Int. Cl.
*H01M 10/42* (2006.01)
*D04H 1/413* (2012.01)
*D04H 1/4218* (2012.01)
*B32B 5/02* (2006.01)
*B32B 5/08* (2006.01)
*B32B 5/26* (2006.01)
*B32B 7/12* (2006.01)
*B32B 27/12* (2006.01)
*B32B 27/32* (2006.01)
*B32B 3/08* (2006.01)
*B32B 3/26* (2006.01)
*B32B 3/28* (2006.01)

(52) U.S. Cl.
CPC .............. *B32B 5/022* (2013.01); *B32B 5/024* (2013.01); *B32B 5/026* (2013.01); *B32B 5/08* (2013.01); *B32B 5/26* (2013.01); *B32B 7/12* (2013.01); *B32B 27/12* (2013.01); *B32B 27/32* (2013.01); *D04H 1/413* (2013.01); *D04H 1/4218* (2013.01); *H01M 2/1633* (2013.01); *H01M 2/1646* (2013.01); *H01M 2/1653* (2013.01); *H01M 2/1686* (2013.01); *H01M 10/06* (2013.01); *H01M 10/4235* (2013.01); *B32B 2250/03* (2013.01); *B32B 2250/20* (2013.01); *B32B 2255/02* (2013.01); *B32B 2255/20* (2013.01); *B32B 2255/26* (2013.01); *B32B 2260/023* (2013.01); *B32B 2260/046* (2013.01); *B32B 2262/02* (2013.01); *B32B 2262/0246* (2013.01); *B32B 2262/0253* (2013.01); *B32B 2262/0269* (2013.01); *B32B 2262/0276* (2013.01); *B32B 2262/0284* (2013.01); *B32B 2262/101* (2013.01); *B32B 2262/12* (2013.01); *B32B 2262/14* (2013.01); *B32B 2264/0207* (2013.01); *B32B 2264/102* (2013.01); *B32B 2264/104* (2013.01); *B32B 2307/202* (2013.01); *B32B 2307/204* (2013.01); *B32B 2307/54* (2013.01); *B32B 2307/546* (2013.01); *B32B 2307/558* (2013.01); *B32B 2307/72* (2013.01); *B32B 2307/732* (2013.01); *B32B 2457/10* (2013.01)

(58) Field of Classification Search
CPC .......... H01M 10/06; H01M 10/4235; D04H 1/4218; D04H 1/413; B32B 2457/10
See application file for complete search history.

(56) References Cited

U.S. PATENT DOCUMENTS

| | | | |
|---|---|---|---|
| 4,849,144 A * | 7/1989 | McLoughlin | H01M 2/1653 264/45.9 |
| 4,908,282 A * | 3/1990 | Badger | H01M 2/1633 29/623.1 |
| 5,009,971 A | 4/1991 | Johnson et al. | |
| 5,035,966 A | 7/1991 | Tokunaga et al. | |
| 5,091,275 A * | 2/1992 | Brecht | H01M 2/145 29/623.1 |
| 5,128,218 A | 7/1992 | Tokunaga et al. | |
| 5,180,647 A | 1/1993 | Rowland et al. | |
| 5,206,100 A | 4/1993 | Muto et al. | |
| 5,221,587 A | 6/1993 | Boehnstedt et al. | |
| 5,225,298 A | 7/1993 | Nakayama et al. | |
| 5,389,471 A | 2/1995 | Kung | |
| 5,541,013 A | 7/1996 | Shiomi et al. | |
| 5,618,642 A | 4/1997 | Samii et al. | |
| 5,679,479 A | 10/1997 | Young et al. | |
| 5,894,055 A | 4/1999 | Young et al. | |
| 5,985,484 A | 11/1999 | Young et al. | |
| 5,989,750 A | 11/1999 | Ohba et al. | |
| 6,132,899 A | 10/2000 | Young et al. | |
| 6,143,441 A | 11/2000 | Zguris et al. | |
| 6,200,706 B1 | 3/2001 | Ashida et al. | |
| 6,225,005 B1 | 5/2001 | Shiomi et al. | |
| 6,495,288 B2 | 12/2002 | Shiomi et al. | |
| 6,506,522 B2 | 1/2003 | Clough | |
| 6,528,205 B1 | 3/2003 | Kishimoto et al. | |
| 6,689,509 B2 | 2/2004 | Zucker | |
| 6,706,450 B2 | 3/2004 | Asada | |
| 6,939,645 B2 | 9/2005 | Sugiyama et al. | |
| 7,097,939 B2 | 8/2006 | Ferreira et al. | |
| 7,288,338 B2 | 10/2007 | Zguris | |
| 8,071,239 B2 | 12/2011 | Sugie et al. | |
| 8,197,967 B2 | 6/2012 | Sugie et al. | |
| 8,404,378 B2 | 3/2013 | Whear et al. | |
| 9,293,748 B1 | 3/2016 | Ashirgade et al. | |
| 9,577,236 B2 | 2/2017 | Ashirgade et al. | |
| 9,627,668 B1 | 4/2017 | Ashirgade et al. | |
| 9,728,756 B2 | 8/2017 | Ashirgade et al. | |
| 9,786,885 B2 | 10/2017 | Jiang | |
| 10,014,501 B2 | 7/2018 | Natesh et al. | |
| 2001/0009734 A1 | 7/2001 | Clough | |
| 2003/0054236 A1 | 3/2003 | Zucker | |
| 2003/0186126 A1 | 10/2003 | Weerts et al. | |
| 2005/0233214 A1 * | 10/2005 | Marple | H01M 2/1653 429/221 |
| 2006/0141350 A1 | 6/2006 | Dreyer et al. | |
| 2008/0299462 A1 | 12/2008 | Whear et al. | |
| 2009/0148760 A1 | 6/2009 | Justice | |
| 2011/0091761 A1 | 4/2011 | Miller et al. | |
| 2011/0123866 A1 | 5/2011 | Pan et al. | |
| 2011/0147320 A1 | 6/2011 | Sealey et al. | |
| 2011/0177375 A1 | 7/2011 | Pfanner et al. | |
| 2011/0293988 A1 | 12/2011 | Obernyer et al. | |
| 2012/0070713 A1 | 3/2012 | Whear et al. | |
| 2012/0070714 A1 | 3/2012 | Chambers et al. | |
| 2012/0070727 A1 * | 3/2012 | Wertz | C03C 4/0035 429/188 |
| 2012/0070728 A1 | 3/2012 | Wertz et al. | |
| 2012/0070729 A1 | 3/2012 | Wertz et al. | |
| 2012/0070747 A1 | 3/2012 | Whear et al. | |
| 2012/0145468 A1 | 6/2012 | Pekala et al. | |
| 2012/0270110 A1 | 10/2012 | Waterhouse et al. | |
| 2013/0017432 A1 | 1/2013 | Roumi | |
| 2013/0029229 A1 | 1/2013 | Mack et al. | |
| 2013/0071723 A1 | 3/2013 | Wertz et al. | |
| 2013/0071734 A1 | 3/2013 | Wertz et al. | |
| 2013/0071735 A1 | 3/2013 | Wertz et al. | |
| 2013/0224632 A1 | 8/2013 | Roumi | |
| 2013/0273409 A1 | 10/2013 | Nandi et al. | |
| 2013/0344373 A1 | 12/2013 | Miller et al. | |
| 2014/0134498 A1 | 5/2014 | Lim et al. | |
| 2014/0227585 A1 | 8/2014 | Wertz et al. | |
| 2014/0234685 A1 | 8/2014 | Nitta et al. | |
| 2014/0255752 A1 * | 9/2014 | Miller | H01M 2/1686 429/145 |
| 2014/0255789 A1 | 9/2014 | Miller et al. | |
| 2014/0272535 A1 | 9/2014 | Clement et al. | |
| 2014/0349169 A1 | 11/2014 | Mizuno et al. | |
| 2014/0377628 A1 | 12/2014 | Nandi et al. | |
| 2015/0050540 A1 | 2/2015 | Toduka et al. | |
| 2015/0086838 A1 | 3/2015 | Guo et al. | |
| 2016/0079581 A1 | 3/2016 | Ashirgade et al. | |

(56) References Cited

U.S. PATENT DOCUMENTS

| | | | |
|---|---|---|---|
| 2016/0149183 | A1 | 5/2016 | Keisler et al. |
| 2016/0164058 | A1 | 6/2016 | Ashirgade et al. |
| 2016/0301053 | A1 | 10/2016 | Jiang |
| 2017/0092917 | A1 | 3/2017 | Ashirgade et al. |
| 2017/0170442 | A1 | 6/2017 | Ashirgade et al. |
| 2017/0179454 | A1 | 6/2017 | Natesh et al. |
| 2017/0294639 | A1 | 10/2017 | Natesh |
| 2017/0373293 | A1 | 12/2017 | Jiang |
| 2018/0026247 | A1 | 1/2018 | Ashirgade et al. |
| 2018/0047964 | A1 | 2/2018 | Natesh et al. |
| 2018/0145298 | A1 | 5/2018 | Vulfson et al. |
| 2018/0175392 | A1 | 6/2018 | Wertz et al. |

FOREIGN PATENT DOCUMENTS

| | | | |
|---|---|---|---|
| EP | 1 585 182 | A1 | 10/2005 |
| EP | 1 617 495 | A1 | 1/2006 |
| GB | 1 291 987 | A | 10/1972 |
| JP | 2006-236991 | A | 9/2006 |
| JP | 2011-233390 | A | 11/2011 |
| KR | 100645970 | B1 | 11/2006 |
| WO | WO 2012/040395 | A2 | 3/2012 |
| WO | WO 2013/154623 | A1 | 10/2013 |
| WO | WO 2014/149703 | A1 | 9/2014 |
| WO | WO 2016/134222 | A1 | 8/2016 |

OTHER PUBLICATIONS

U.S. Appl. No. 15/127,057, filed Sep. 19, 2016, Natesh et al.
U.S. Appl. No. 13/834,597, filed Mar. 15, 2013, Clement et al.
U.S. Appl. No. 13/239,273, filed Sep. 21, 2011, Wertz et al.
U.S. Appl. No. 15/642,588, filed Jul. 6, 2017, Ashirgade et al.
U.S. Appl. No. 14/550,413, filed Nov. 21, 2014, Keisler et al.
U.S. Appl. No. 15/647,327, filed Jul. 12, 2017, Jiang.
U.S. Appl. No. 15/359,902, filed Nov. 23, 2016, Vulfson et al.
U.S. Appl. No. 15/380,990, filed Dec. 15, 2016, Wertz et al.
PCT/US15/21761, Jun. 29, 2015, International Search Report and Written Opinion.
U.S. Appl. No. 15/983,299, filed May 18, 2018, Natesh et al.
U.S. Appl. No. 15/839,810, filed Dec. 12, 2017, Clement et al.
U.S. Appl. No. 16/009,978, filed Jun. 15, 2018.
International Search Report and Written Opinion for PCT/US15/21761 dated Jun. 29, 2015.
[No Author Listed], Micrex/Microcreper. Micrex Corporation. Walpole, MA. In existence as of Jan. 2015 Last accessed Jun. 6, 2017 at <http://micrex.com/micrexmicrocreper>. 4 pages.
Turbak, Nonwovens: Theory, Process, Performance, and Testing. Tappi Press 1993. Excerpt pp. 144-147.
Zguris et al., Nonwovens Battery Separators to improve performance in lead acid battery systems. Mabat Conference. Warsaw, Poland. Jul. 24, 1991. 17 pages.

\* cited by examiner

BATTERY SEPARATORS COMPRISING CHEMICAL ADDITIVES AND/OR OTHER COMPONENTS

RELATED APPLICATIONS

This application is a U.S. National Stage patent application based on International Application PCT/US2016/018610, filed Feb. 19, 2016, which claims priority to India Patent Application 483/DEL/2015, filed Feb. 19, 2015, which are incorporated herein by reference in their entirety.

FIELD OF INVENTION

The present embodiments relate generally to non-woven webs, and specifically, to non-woven webs that can be used as battery separators for batteries, such as lead acid batteries.

BACKGROUND

Batteries convert stored chemical energy into electrical energy and are commonly used as energy sources. Typically, a battery comprises one or more electrochemical cells including a negative electrode, a positive electrode, an electrolyte, and a battery separator. Battery separators are a critical component in many batteries. The battery separator mechanically and electrically isolates the negative and positive electrodes, while also allowing ions in the electrolyte to move between the electrodes.

Battery separators should be chemically, mechanically, and electrochemically stable under the strongly reactive environments in the battery during operation, should not adversely interact with the electrolyte and/or electrode materials, and have no deleterious effect on of the battery's performance (e.g., energy production, cycle life, safety). For example, the battery separator should not degrade, leach harmful components, react in a negative way with the electrode materials, allow short circuits to form between the electrodes, and/or crack or break during battery assembly and/or operation. Though many battery separators exist, improvements in the stability of battery separators and/or battery separators that lead to enhanced battery performance are needed.

SUMMARY

In one set of embodiments, battery separators are provided. In one embodiment, a battery separator comprises a non-woven web comprising a plurality of glass fibers having an average diameter of greater than or equal to about 0.1 microns and less than or equal to about 15 microns, wherein the glass fibers are present in an amount of greater than or equal to about 2 wt. % and less than or equal to about 95 wt. % of the non-woven web, and one or more sulfate salts, wherein the one or more sulfate salts are present in an amount of greater than or equal to about 0.1 wt. % and less than or equal to 30 wt. % of the battery separator prior to contact with a battery electrolyte.

In another embodiment, a battery separator comprises a non-woven web comprising a plurality of glass fibers having an average diameter of greater than or equal to about 0.1 microns and less than or equal to about 15 microns, wherein the glass fibers are present in an amount of greater than or equal to about 2 wt. % and less than or equal to about 95 wt. % of the non-woven web, and one or more antioxidants, wherein the antioxidants are present in an amount of greater than or equal to about 0.05 wt. % and less than or equal to about 5 wt. % of the battery separator.

In one embodiment, a battery separator comprises a non-woven web comprising a plurality of glass fibers having an average diameter of greater than or equal to about 0.1 microns and less than or equal to about 15 microns, wherein the glass fibers are present in an amount of greater than or equal to about 2 wt. % and less than or equal to about 95 wt. % of the non-woven web and a plurality of synthetic fibers, wherein the synthetic fibers are present in an amount of greater than or equal to about 1 wt. % and less than or equal to about 80 wt. % of the non-woven web. The battery separator also comprises a plurality of inorganic particles, wherein the inorganic particles are resistant to sulfuric acid, and wherein the inorganic particles are present in the non-woven web in an amount of greater than or equal to about 10 wt. % and less than or equal to about 80 wt. % of the non-woven web, and one or more rubbers, wherein the one or more rubbers are present in the battery separator in an amount of greater than or equal to about 3 wt. % and less than or equal to about 80 wt. % of the battery separator.

In another embodiment, a battery separator comprises a non-woven web comprising a plurality of glass fibers having an average diameter of greater than or equal to about 0.1 microns and less than or equal to about 15 microns, wherein the glass fibers are present in an amount of greater than or equal to about 2 wt. % and less than or equal to about 100 wt. % of the non-woven web. The battery separator has a mean flow pore size of greater than or equal to about 0.5 microns and less than or equal to about 30 microns. The battery separator has a percent loss of breakdown voltage of less than or equal to about 80%.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figure, which is schematic and is not intended to be drawn to scale. In the figure, each identical or nearly identical component illustrated is typically represented by a single numeral. For purposes of clarity, not every component is labeled, nor is every component of each embodiment of the invention shown where illustration is not necessary to allow those of ordinary skill in the art to understand the invention. In the figures.

DETAILED DESCRIPTION

Figure 1:
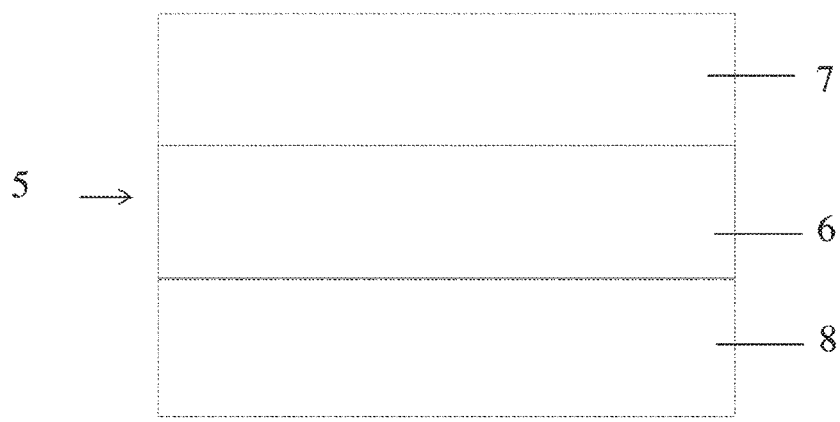
FIG. 1 is a schematic diagram of a battery separator including a non-woven web according to one set of embodiments.

Battery separators are provided. In some embodiments, the battery separators may comprise a non-woven web including one or more chemical additives. The chemical additives may impart beneficial properties, such as enhanced separator stability and/or battery performance. In some embodiments, the chemical additive(s) may confer resistance to oxidation, heavy metal deposition, and/or formation of short circuits. For example, a lead acid battery separator may comprise a non-woven web that includes one or more sulfate salts. The sulfate salts may prevent internal shorts by inhibiting the dissolution of metallic compounds, such as lead sulfate, within the separator. As another example, a lead acid battery separator may comprise rubber and/or one or more antioxidants. The rubber may scavenge certain heavy metals (e.g., antimony) that might otherwise deposit on the surface of a battery electrode and reduce battery performance. The antioxidant may prevent degradation of the non-woven web in the caustic battery environment by inhibiting the oxidation of organic material in the non-woven web. The respective characteristics and amounts of the chemical additive(s) may be selected to impart desirable properties while having relatively minimal or no adverse effects on another property of the battery separator and/or the overall battery.

In some embodiments, a battery separator comprises a non-woven web including glass fibers and a pore structure (e.g., mean flow pore size) that inhibits or reduces dendrite formation, resulting in the battery separator having an increased lifetime as evidenced by a relatively low percent loss in breakdown voltage. The battery separator may optionally include (or not include) an additive as described herein.

In some embodiments, a battery separator described herein may comprise a layer having a relatively low apparent density; for example, the density that includes any unoccupied space within the outermost boundaries of the layer may be relatively low. The low apparent density may be attributed to, at least in part, the geometry of the layer. For instance, in some embodiments, the layer may include undulations and/or have at least one non-planar surface (e.g., a corrugated layer; an embossed layer), as described in more detail below. In some embodiments, a battery comprising a layer having a relatively low apparent density may have desirable properties, including relatively low electrical resistance and/or relatively high capacity.

The battery separators described herein may be well suited for a variety of battery types, including lead acid batteries.

In a typical battery, the battery separator primarily functions to electrically and mechanically isolate the negative electrode and positive electrode, while allowing ionic conduction. However, the presence of the battery separator between the electrodes can affect battery performance (e.g., electrical resistance, lifetime). For instance, the battery separator generally increases the resistance to ion movement between the electrodes compared to the electrolyte alone and thus increases the electrical resistance of the battery. Moreover, the battery separator can reduce the amount of electrolyte between the electrodes compared to the electrolyte alone for a given volume between the electrodes), due to the volume occupied by the battery separator. This reduction of electrolyte can limit the battery capacity.

In general, the chemical (e.g., composition, stability, wettability), structural (e.g., porosity, pore size, thickness, permeability), and/or mechanical (e.g., strength, stiffness) properties of the battery separator can affect battery performance (e.g., electrical resistance, lifetime). In some battery applications, a trade-off exists between the properties of the battery separator that provide sufficient isolation and/or ion movement, and battery performance. For instance, a battery separator having a sufficient porosity to allow for ion mobility may be brittle and result in early battery failure due to damage to the separator. The balance of separator and battery performance is further aggravated in battery applications that utilize highly reactive operating conditions, such as lead acid batteries. In such applications, the chemical, mechanical, and electrochemical stability of the battery separator may be important design parameters to be balanced with separator and battery performance. Often, conventional battery separators are designed to have desirable stability, separation performance, or battery performance at the expense of one or more other properties such as stability, separation performance, and/or battery performance. For example, some conventional battery separators have attempted to minimize the influence of the battery separator on capacity and electrical resistance by reducing the mass of the battery separator to increase the volume porosity. However, the tradeoff between mass and mechanical stability can limit this approach. Accordingly, there is a need for improved battery separators.

In the present disclosure, battery separators are provided. In some embodiments, a battery separator may include a layer (e.g., non-woven web) comprising one or more chemical additives, and/or that has at least one non-planar surface (e.g., a shaped layer, or a layer that includes undulations or other surface topography, as described herein). Such a layer may be used alone, or in combination with an additional layer, in a battery separator as described herein. The chemical additive(s) and/or layer shape/topography can be used to impart desirable properties to the battery separator and/or overall battery (e.g. stability, separation performance, battery performance). For instance, in some embodiments involving a battery comprising a layer that includes undulations and/or has at least one non-planar surface (i.e., a non-planar layer) positioned between two electrodes, the shape of the layer may increase the void volume between the electrodes resulting in a decrease in electrical resistance and dendrite formation. In certain embodiments, these desirable properties can be imparted while having little or no adverse effects on another property of the battery separator and/or overall battery.

In some such embodiments, a battery separator comprising a layer (e.g., non-woven web) described herein does not suffer from one or more limitations of certain existing battery separators. For instance, in some embodiments involving a battery separator that includes a beneficial component that is susceptible to an adverse interaction with a species (e.g., acid generated radical) in the electrolyte, the battery separator may include a chemical additive (e.g., an antioxidant) capable of complexing and/or neutralizing the adverse species. The inclusion of such a chemical additive can allow the battery separator to include an adequate percentage of the susceptible component (e.g., rubber) without (or minimally) negatively impacting battery performance. As described further below, such a battery separator may include, in some embodiments, a non-woven web comprising glass fibers and one or more chemical additives (e.g., sulfate salts, rubber, antioxidants). In certain embodiments, the non-woven web may optionally include a binder resin, synthetic fibers, inorganic particles, and/or other components as described herein.

A non-limiting example of a battery separator including a non-woven web is shown schematically in FIG. 1. In some embodiments, a battery separator 5 may include a non-woven web 6. In some embodiments, a non-woven web 6 includes one or more chemical additives. In certain embodiments, non-woven web 6 may be a non-planar layer. In some instances, the battery separator may be a non-woven web that is a non-planar layer including one or more chemical additive(s). In some embodiments, the battery separator may be a single layer (e.g., the separator does not include layers 7 or 8 in FIG. 1). For instance, the battery separator may be formed of a single non-woven web. In certain embodiments, non-woven web 6 may include glass fibers and a pore structure (e.g., a mean flow pore size) that inhibits or reduces dendrite formation, leading to the non-woven web having a relatively high lifetime and/or a relatively low percent loss in breakdown voltage. Such a non-woven web may include one or more chemical additive(s) in some embodiments, or no such additive(s) in other embodiments.

In other embodiments, the battery separator may comprise multiple layers. The multi-layer battery separator may include at least one non-woven web (e.g., at least two non-woven webs, at least three non-woven webs). In some embodiments, the at least one non-woven web may have one or more non-planar surfaces and/or may include one or more chemical additive(s), as described herein. In some embodiments, in addition to non-woven web 6, the battery separator may include an optional layer 7 and/or 8 (e.g., additional layers), which may be adjacent the non-woven web. The additional layer may be planar or non-planar as described herein.

For instance, in one particular embodiment, the battery separator may comprise a non-planar, non-woven layer 6, a layer 7 (e.g., non-woven web) (that may, for example, allow even pressure distribution of non-woven layer 6 in a battery configuration), and a non-woven web 8. In some such cases, layer 7 may be a non-planar, non-woven layer having a relatively high Gurley stiffness (e.g., greater than or equal to about 500 mg and less than or equal to about 5000 mg, greater than or equal to about 800 to less than or equal to about 1200 mg). Such a layer may have, in some embodiments, substantially the same or similar attributes as non-woven layer 6 (e.g., chemical stability, volume porosity). However, other configurations are also possible. In some embodiments in which non-woven layer 6 is non-planar, layer 7 may be a planar layer. For instance, in one embodiment, layer 7 may be the planar version of non-woven layer 6. In other embodiments, optional layer 7 and/or 8 may be a non-planar layer. In general, any layer of the battery separator may be non-planar and/or may include one or more chemical additives, as described herein.

In general, a layer within a battery separator, including any optional layer(s) (e.g., additional layer(s)) should be stable in a battery environment, have sufficient porosity to allow for sufficient ionic conduction, and have a suitable thickness. For instance, in a lead acid battery, the layer(s) may have an acid weight loss of less than 5% according to the standard BCI 03-A. As used herein, acid weight loss refers to the percent of weight loss due to acid erosion, as described in more detail below. In certain embodiments, the layer(s), including the optional layer(s), may have a porosity of greater than or equal to about 10% and less than or equal to about 99% (e.g., greater than or equal to about 65% and less than or equal to about 95%) and a thickness of greater than or equal to about 0.1 mm and less than or equal to about 3 mm (e.g., greater than or equal to about 0.1 mm and less than or equal to about 3 mm). It should be appreciated, however, that other ranges of acid weight loss, porosity, and/or thickness are possible.

In some embodiments, one or more optional layers (e.g., additional layers) may be a non-woven web. For instance, in some embodiments a second non-woven web may be present in the battery separator. In certain embodiments, the optional layer may be a planar layer having a relatively low apparent density (e.g., an open layer), as described herein. Non-limiting examples of optional/additional layers include non-woven webs formed of long, coarsely drawn individual glass fibers (e.g., having a fiber diameter of greater than about 13 microns) bonded with an adhesive in the parallel direction (e.g., a sliver), rovings (e.g., a long fiber adhesive-bonded non-woven web used for insulation), braids, spacer fabrics (e.g., layers separated by a system of rigid support members running perpendicular to the outer surfaces), corduroy fabrics, ribbed knits, porous membranes, functionalized needle punched and hydroentangled non-woven webs, and nets (e.g., synthetic expanded mesh). Woven webs can also be used. In other embodiments, one or more optional layers (e.g., additional layers) may be an extruded layer (e.g., a non-fibrous layer). Other types of layers are also possible.

As used herein, when a layer is referred to as being "adjacent" another layer, it can be directly adjacent to the layer, or an intervening layer also may be present. A layer that is "directly adjacent" another layer means that no intervening layer is present.

In some embodiments, one or more layer in the battery separator may be designed to be discrete from another layer. That is, the components (e.g., fibers) from one layer do not substantially intermingle (e.g., do not intermingle at all) with components (e.g., fibers) from another layer. For example, with respect to FIG. 1, in one set of embodiments, fibers from non-woven web 6 do not substantially intermingle with fibers of optional layer 8. Discrete layers may be joined by any suitable process including, for example, lamination, thermo-dot bonding, calendering, ultrasonic processes, or by adhesives, as described in more detail below. It should be appreciated, however, that certain embodiments may include one or more layers that are not discrete with respect to one another.

It should be understood that the configurations of the layers shown in the figures are by way of example only, and that in other embodiments, battery separators including other configurations of layers may be possible. For example, while the optional layers are shown in a specific order in FIG. 1, other configurations are also possible. For example, optional layer 7 may be positioned between the non-woven web and optional layer 8. Furthermore, in some embodiments, additional layers may be present in addition to the ones shown in the figures. It should also be appreciated that not all components shown in the figures need be present in some embodiments.

As described herein, a battery separator comprising a non-woven web may include one or more chemical additives. The chemical additive(s) may be associated with the non-woven web in any suitable manner. The chemical additive(s) may be, for example, immobilized on at least a portion of the non-woven web and/or on or within a carrier (e.g., a coating, a particle) present in the non-woven web. For example, in some embodiments an additive is encapsulated (e.g., partially or fully) within a coating on at least a portion of the non-woven web. In some embodiments, the chemical additive(s) may be part of a binder resin that is coated on the non-woven web. In certain embodiments, the chemical additive(s) may be coated on at least portions of the non-woven web without a resin. In some instances, the chemical additive(s) may be non-covalently attached (e.g., adsorbed) to one or more components of the non-woven web, such as fibers, a resin, and/or inorganic particles within the non-woven web. Covalent attachment or ionic attachment of a chemical additive to a portion of the non-woven web is also possible. In some cases, a chemical additive is attached to a portion of a fiber web through electrostatic interactions. Other configurations are also possible.

A non-limiting example of a non-woven web coated with a chemical additive is shown in FIG. 2. Examples of chemical additives are provided below. As shown illustratively in FIG. 2A, a non-woven web 10, shown in cross-section, may include a plurality of fibers 15 (e.g., glass fibers, glass fibers and synthetic fibers). In some instances, non-woven web 10 may also comprise a plurality of inorganic particles 18 (e.g., sulfuric acid-resistant inorganic particles). In embodiments in which the chemical additive is part of a binder resin, all or portions of the non-woven web may be coated with a binder resin comprising chemical additive 22 distributed therein, which is shown illustratively in FIGS. 2B-2C. The binder resin, with chemical additive distributed within, may remain on the non-woven web after the non-woven web has been coated and dried. In other embodiments, all or portions of the non-woven web may be coated with chemical additive 22 absent a binder resin, as shown illustratively in FIG. 2D.

Figure 2A:
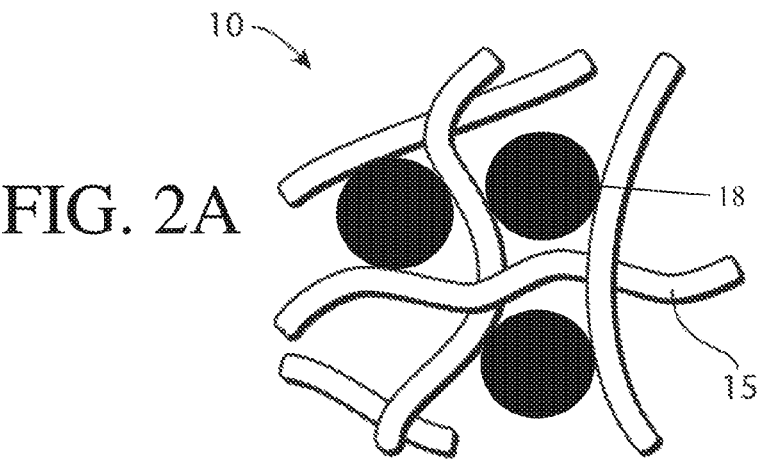
FIG. 2A is a schematic diagram showing a cross section of a non-woven web including a plurality of fibers according to one set of embodiments.
Figure 2B:
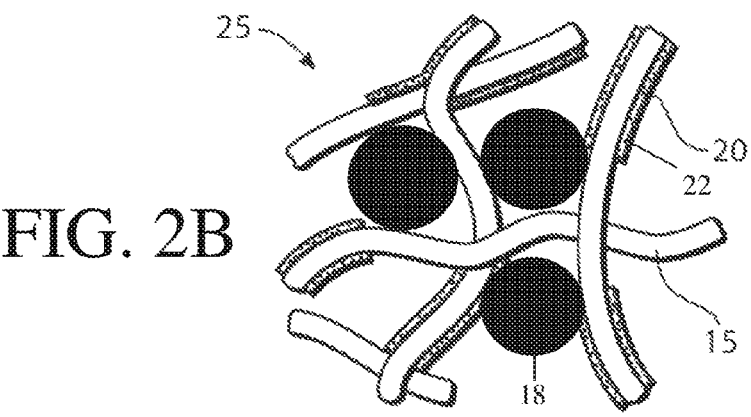
FIG. 2B is a schematic diagram showing a cross section of a non-woven web including fibers that are partially coated with a resin including an additive according to one set of embodiments.
Figure 2C:
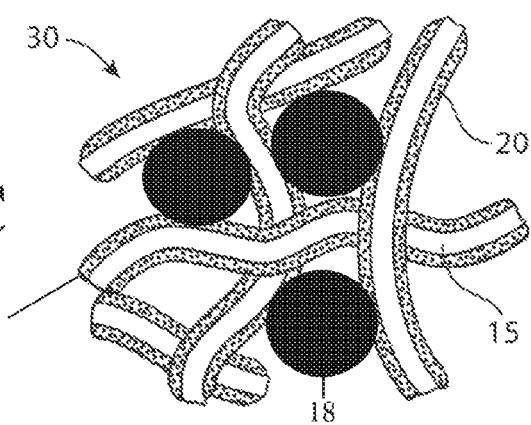
FIG. 2C is a schematic diagram showing a cross section of a non-woven web in which substantially all of the fibers are coated with a resin including an additive according to one set of embodiments.
Figure 2D:
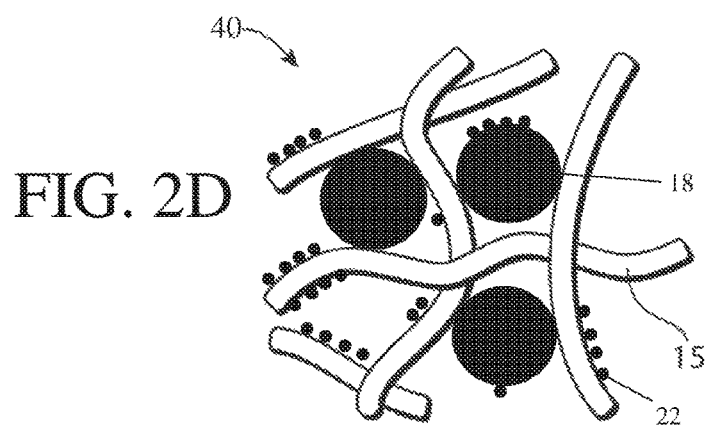
FIG. 2D is a schematic diagram showing a cross section of a non-woven web that is partially coated with an additive according to one set of embodiments.

In one set of embodiments, a coating including a chemical additive may be formed on one or more sides or surfaces of the non-woven web. In other embodiments, the chemical additive may be applied to the non-woven web to produce a coating 20 on at least a portion of the fibers and/or other components (e.g., inorganic particles) in the interior of the non-woven web (i.e., through the thickness of the non-woven web). In certain embodiments, substantially all of the fibers of the non-woven web may be coated with the chemical additive, as illustrated in FIG. 2C. However, in some embodiments, not all fibers and/or other components of the non-woven web are coated, e.g., as illustrated in FIG. 2B. In some embodiments, regardless of whether the surface and/or interior of the non-woven web are coated, the chemical additive and/or binder resin components may absorb into the surface of the fibers and/or other components of the non-woven web. In some embodiments, at least one of coated non-woven webs 25, 30, and 40, shown in FIGS. 2B, 2C, and 2D, respectively, may be included in a battery separator and may have enhanced chemical stability and battery performance as described herein.

A design of a battery separator that produces desirable separator performance, battery performance, and/or chemical stability is difficult to achieve for batteries having highly reactive operating conditions. For instance, in some embodiments, battery separators having the requisite chemical stability may only be formed from a limited number of materials and/or may be required to have a certain structure. Conversely, separators that produce excellent battery performance may be susceptible to degradation and/or adverse chemical reaction in a highly reactive battery environment. Certain features of a battery separator described herein will now be described in the context of an exemplary application: lead acid batteries. Lead acid batteries are used herein as one example of a battery that has highly reactive operating conditions. It should be understood, however, that the battery separators described herein may be suitable for a wide variety of applications and are not limited to use in lead acid batteries.

Lead acid batteries comprise a positive electrode comprising lead dioxide ($PbO_2$), and negative electrode comprising metallic lead, and an electrolyte comprising a high molarity aqueous sulfuric acid solution. In some embodiments, the positive electrode and/or negative electrode may contain a lead alloy comprising a heavy metal, such as antimony for processing into grids and/or plates. The caustic battery environment may lead to reactions that liberate at least a portion of the heavy metal from one or more electrodes into the electrolyte. The heavy metal may undergo subsequent reactions in the electrolyte and/or deposit on the surface of an electrode, adversely altering battery performance. For example, antimony may be released from the positive electrode as the grid material is oxidized or corroded, migrate to the negative electrode due to the attraction of heavy metals to the negative plate, and deposit on the surface of the negative electrode in metallic form as it is attracted by electrochemical potential. The presence of the antimony on the negative electrode may alter the voltage at which the electrolysis of water occurs in the lead acid battery. As a result, during charging of the battery, electrolysis of water may occur more readily at an electrode having heavy metal deposits and more water consumption (or loss) may occur during battery operation. Increased water consumption may lead to high sulfuric acid concentration that may preclude effective recharging, reduced electrolyte quantity in cell, and/or accelerate grid corrosion. This may also necessitate more frequent maintenance of battery through watering. The highly acidic environment can also produce radicals that are capable of degrading organic material, such as an organic material (e.g., fibers, filler, binder or resin) in the battery separator.

During discharge of the lead acid batteries, the following half reactions occur at the negative electrode and positive electrode, respectively.

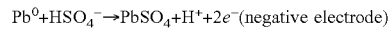
$Pb^0 + HSO_4^- \rightarrow PbSO_4 + H^+ + 2e^-$ (negative electrode)

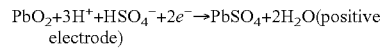
$PbO_2 + 3H^+ + HSO_4^- + 2e^- \rightarrow PbSO_4 + 2H_2O$ (positive electrode)

Without being bound by theory, it is believed that discharging of the battery results in a change in the sulfate ion concentration in the electrolyte due to the consumption of the sulfate to form lead sulfate at the negative electrode and positive electrodes. Accordingly, the change in sulfate ion concentration increases the solubility of other sulfate compounds in the battery, such as the lead sulfate produced at the negative electrode and positive electrode. In some instances, at least a portion of the lead sulfate formed at the electrodes may dissolve in the electrolyte and diffuse within the battery separator (e.g., a non-woven web within the separator). Charging of batteries produces the reverse reaction at the electrodes and results in an increase in the sulfate ion concentration in the electrolyte. Accordingly, the solubility of the other sulfate species, such as lead sulfate, decreases. It is believed that the decrease in solubility may cause lead from dissolved lead sulfate in the battery separator and/or elsewhere to precipitate. The lead sulfate can precipitate to form metallic lead in dendrite form when sulfate content in the electrolyte increases as the battery is recharged. In certain embodiments, recharging of the battery may lead to the production of dendrites in the form of a continuous lead (Pb) pathway from the negative electrode to positive electrode through the battery separator, resulting in a short circuit.

It is also believed that the $PbO_2$ and metallic lead, which is formed from $PbSO_4$ during charging, are more loosely bound to the positive and negative electrode, respectively, than the $PbO_2$ and metallic lead that has not undergone an electrochemical reaction. It is believed that cycling of the battery results in shedding of the active material in the electrode due to this loss of cohesiveness of the active material. The end of battery cycle life may come from the shedding of the active mass.

In some embodiments, a battery separator that produces desirable separation and/or battery performance may include certain chemical additives to further enhance the separator's chemical stability and/or performance in a battery, such as a lead acid battery. For instance, in some embodiments, a battery separator including a non-woven web comprising glass fibers may include one or more sulfate salts. The sulfate salts may be present in amount of, for example, greater than or equal to about 0.1 wt. % and less than about 30 wt. % (e.g., greater than or equal to about 0.5 wt. % and less than about 5 wt. %) of the battery separator and/or the non-woven web. In some embodiments, the sulfate salt may be a solid. For instance, the non-woven web and/or battery separator may comprise sulfate salt particles.

Without being bound by theory, it is believed that sulfate salts present in (e.g., originating from) the non-woven web and/or battery separator may prevent or reduce the solubilization of lead sulfate through the common ion effect. That is, the sulfate salts may reduce the lead sulfate solubility during the discharging and charging processes, thereby reducing or preventing the amount of lead dendrites, as described in more detail below.

Due to the relatively high concentration of sulfuric acid in the electrolyte of lead acid batteries, the sulfate salt within the non-woven web and/or battery separator may have a relatively low solubility in the bulk electrolyte. In some such embodiments, a relatively high percentage of the sulfate salt in the non-woven web (e.g., greater than or equal to about 20%, greater than or equal to about 30%, greater than or equal to about 40%, greater than or equal to about 50%, greater than or equal to about 60%, greater than or equal to about 70%, greater than or equal to about 80%, greater than or equal to about 90%, greater than or equal to about 95%) may not dissolve (e.g., may be in solid form) and/or may remain within the non-woven web and/or battery separator (e.g., in solid or dissolved form) prior to operation of the battery and/or during battery discharge. In some such instances, solid sulfate salt within the non-woven web and/or battery separator may dissolve in the electrolyte, but the electrolyte containing the dissolved sulfate salt may remain within the pores of the battery separator, also referred to herein as the local electrolyte.

When the concentration of sulfate ion in the bulk electrolyte is relatively low (e.g., when the state of charge of the battery is low, the concentration of sulfate ion within the local electrolyte may remain relatively high. In some instances, the relatively high concentration of sulfate ion in the local electrolyte may be a result of the dissolved sulfate salt originating from the non-woven web and/or battery separator remaining in the battery separator. In such embodiments, a concentration gradient of sulfate salt may exist between the local electrolyte and the bulk electrolyte.

In certain instances, such as during discharge, a relatively low concentration of sulfate ions in the bulk electrolyte may result in a low concentration of sulfate ions in the local electrolyte. The low concentration of sulfate ion in the local electrolyte may cause at least a portion of the solid sulfate salt in the non-woven web/and or battery separator to dissolve into the local electrolyte, thereby increasing the concentration of sulfate ion in the local electrolyte, such that the local electrolyte has a relatively high concentration of sulfate ion.

In embodiments in which the local electrolyte has a relatively high concentration of sulfate ion, lead sulfate may have a relative low solubility within the local electrolyte (e.g., the electrolyte in the pores of non-woven web and/or battery separator). This reduced solubilization of lead sulfate within the non-woven web and/or battery separator can result in the reduction or prevention of lead dendrites at or in the non-woven web and/or battery separator.

As described herein, in some embodiments a battery separator includes a dried non-woven web having a certain amount of sulfate salts incorporated therein. For instance, the sulfate salts may be present in the battery separator prior to the separator's contact with or exposure to an electrolyte (e.g., present in the battery separator prior to the separator being incorporated into a battery). In some cases, the sulfate salts' ability to reduce the solubilization of lead sulfate may be more effective when the sulfate salts are present in the battery separator prior to the separator's contact with or exposure to an electrolyte (e.g., present in the battery separator prior to the separator being incorporated into a battery), compared to sulfate salts originating from (or added to) the bulk electrolyte solution directly. It is believed that sulfate salts incorporated into the separator may be more effective in resisting dendrite formation, since the sulfate salts may have a higher local concentration within the battery separator (e.g., in the local electrolyte) compared to when the sulfate salt originates from or is added to the bulk electrolyte directly.

In certain embodiments, a lower concentration of sulfate salts may be used to achieve the desired result (e.g., preventing dendrite formation) when the sulfate salts are present in the battery separator and/or non-woven web prior to the separator's contact with or exposure to an electrolyte (e.g., present in the battery separator prior to the separator being incorporated into a battery), compared to a concentration required when the sulfate salts are originating from (or added to) the bulk electrolyte directly. It may be desirable for a battery to include lower concentrations of sulfate salts to reduce certain undesirable effects of sulfate salts in the electrolyte, such as self-discharge.

In some embodiments, the total weight percentage of sulfate salts in the non-woven web and/or battery separator (e.g., prior to the non-woven web's or separator's contact with a battery electrolyte) may be greater than or equal to about 0.1 wt. %, greater than or equal to about 0.2 wt. %, greater than or equal to about 0.5 wt. %, greater than or equal to about 0.8 wt. %, greater than or equal to about 1 wt. %, greater than or equal to about 2 wt. %, greater than or equal to about 3 wt. %, greater than or equal to about 5 wt. %, greater than or equal to about 8 wt. %, greater than or equal to about 10 wt. %, greater than or equal to about 12 wt. %, greater than or equal to about 15 wt. %, greater than or equal to about 18 wt. %, greater than or equal to about 20 wt. %, greater than or equal to about 22 wt. %, or greater than or equal to about 25 wt. %. In some cases, the total weight percentage of sulfate salts in the non-woven web and/or battery separator (e.g., prior to the non-woven web's or separator's contact with a battery electrolyte) may be less than or equal to about 30 wt. %, less than or equal to about 28 wt. %, less than or equal to about 25 wt. %, less than or equal to about 22 wt. %, less than or equal to about 20 wt. %, less than or equal to about 18 wt. %, less than or equal to about 15 wt. %, less than or equal to about 12 wt. %, less than or equal to about 10 wt. %, less than or equal to about 8 wt. %, less than or equal to about 5 wt. %, less than or equal to about 4 wt. %, less than or equal to about 3 wt. %, less than or equal to about 2 wt. %, or less than or equal to about 1 wt. %.

Combinations of the above-referenced ranges are also possible (e.g., a total weight percentage of sulfate salts of greater than or equal to about 0.1 wt. % and less than about 30 wt. %, greater than or equal to about 1 wt. % and less than about 10 wt. %, greater than or equal to about 0.5 wt. % and less than about 5 wt. %). Other ranges are also possible. The total weight percentage of sulfate salts in the non-woven web and/or battery separator is based on the dry solids and can be determined prior to adding the sulfate salts to the non-woven web and/or battery separator. In some embodiments, the sulfate salt may be part of a resin that is coated on the non-woven web. In some embodiments, the sulfate salt may be coated onto or incorporated with another component of the non-woven web and/or battery separator (e.g., silica particles, fibers). In certain embodiments, the total percentage of sulfate salts in the dry solids of the binder resin may include one or more of the above-referenced ranges.

In general, any sulfate salt suitable for including in the battery separator may be used. In some embodiments, a suitable sulfate salt may be more soluble in the particular electrolyte chosen for a battery than lead sulfate. For instance, the sulfate salt may have a higher solubility product constant in the electrolyte than lead sulfate. In some embodiments, a sulfate salt incorporated in a battery separator described herein does not adversely affect battery performance by, e.g., interfering with an electrochemical reaction in the battery and/or adversely interacting with a battery component. Additionally, the sulfate salt may be water-soluble. Non-limiting examples of sulfate salts that may be utilized include sodium sulfate, magnesium sulfate, calcium sulfate, aluminum sulfate, cobalt sulfate, potassium sulfate, zinc sulfate, and combinations thereof. In certain embodiments, sulfate salts comprising divalent cations (e.g., magnesium sulfate, calcium sulfate) may be used. In some instances, divalent cations may interact with surfactants and/or may coagulate emulsion binder resins, thereby reducing resin migration in the non-woven web.

In some embodiments, the sulfate salt may be in the form of a particle. The average particle size (e.g., average diameter, or average cross-sectional dimension) of the sulfate salt particles included in a non-woven web and/or separator described herein may be, for example, greater than or equal to about 0.01 micron, greater than or equal to about 0.05 micron, greater than or equal to about 0.1 micron, greater than or equal to about 0.5 micron, greater than or equal to about 1 micron, greater than or equal to about 3 microns, greater than or equal to about 5 microns, greater than or equal to about 10 microns, greater than or equal to about 20 microns, greater than or equal to about 30 microns, greater than or equal to about 40 microns, greater than or equal to about 50 microns, greater than or equal to about 60 microns, greater than or equal to about 70 microns, greater than or equal to about 80 microns, or greater than or equal to about 90 microns. The particles may have an average particle size of, for example, less than or equal to about 100 microns, less than or equal to about 90 microns, less than or equal to about 80 microns, less than or equal to about 70 microns, less than or equal to about 60 microns, less than or equal to about 50 microns, less than or equal to about 40 microns, less than or equal to about 30 microns, less than or equal to about 20 microns, less than or equal to about 10 microns, less than or equal to about 5 microns, or less than or equal to about 1 microns. Combinations of the above-referenced ranges are also possible (e.g., greater than or equal to about 1 micron and less than or equal to about 50 microns, greater than or equal to about 3 micron and less than or equal to about 20 microns). Other ranges are also possible. Particle sizes described herein (e.g., average particle sizes) refer to ones measured by dynamic light scattering.

In some embodiments, a battery separator including a non-woven web described herein may have an increased lifetime compared to certain existing battery separators. For example, a battery separator including a non-woven web comprising glass fibers and having a suitable pore structure (e.g., mean flow pore size) as described herein may have reduced dendrite formation compared to certain existing battery separators (e.g., certain polyethylene membrane separators). For instance, without being bound by theory, the glass fibers (and any other optional fibers in the non-woven web) may form tortuous pathways or pores that increase the path length across the non-woven web, thereby making it more difficult for dendrites to form across the non-woven web. The non-woven web may also have a suitable mean flow pore size (e.g., a mean flow pore size in one or more ranges described herein) for ions to move freely across the web. The battery separator may therefore have an increased lifetime compared to certain existing battery separators (e.g., certain polyethylene membrane separators).

As another example, in some embodiments, a battery separator including a non-woven web comprising one or more sulfate salts may reduce dendrite formation, and accordingly, may increase the lifetime of the battery separator, compared to a battery separator lacking the one or more sulfate salts, all other factors being equal. As described herein, the sulfate salts may be present in the battery separator prior to the separator's contact with or exposure to an electrolyte (e.g., present in the battery separator prior to the separator being incorporated into a battery).

The increase in lifetime of the battery separator and/or reduction in dendrite formation may be measured indirectly by the percent loss of breakdown voltage (BDV) of a battery separator (e.g., a battery separator optionally comprising sulfate salts and/or a pore structure described herein) after exposure to lead electroplating conditions.

The breakdown voltage has its ordinary meaning in the art and refers to the minimum voltage that causes a portion of the battery separator to become electrically conductive. In general, the breakdown voltage is a measure of the dielectric strength of the dry battery separator. Briefly, the breakdown voltage can be measured by applying 100V, using 10 cm by 10 cm electrodes, across the battery separator and then increasing the voltage applied across the separator until a current of 18 mA is produced. The applied voltage at which electrical conductivity occurs is the breakdown voltage. In general, the breakdown voltage of a battery separator without a short will be relatively high. However, a short (e.g., due to dendrite formation) will produce a relatively low breakdown voltage. The loss in breakdown voltage is the percent decrease in the breakdown voltage after exposure of the battery separator to certain conditions (e.g., electroplating conditions).

In some embodiments, the percent loss of BDV of a battery separator (e.g., a battery separator optionally comprising sulfate salts and/or a pore structure described herein) after exposure to lead electroplating conditions may be less than or equal to about 80%, less than or equal to about 75%, less than or equal to about 70%, less than or equal to about 65%, less than or equal to about 60%, less than or equal to about 55%, less than or equal to about 50%, less than or equal to about 45%, less than or equal to about 40%, less than or equal to about 35%, less than or equal to about 30%, less than or equal to about 25%, less than or equal to about 20%, less than or equal to about 15%, less than or equal to about 10%, less than or equal to about 8%, less than or equal to about 5%, less than or equal to about 3%, less than or equal to about 3%, or less than or equal to about 1%. In some cases, the percent loss of BDV of a battery separator (e.g., a battery (e.g., a battery separator optionally comprising sulfate salts and/or a pore structure described herein) after exposure to lead electroplating conditions may be greater than or equal to about 0%, greater than or equal to about 0.05%, greater than or equal to about 0.1%, greater than or equal to about 0.2%, greater than or equal to about 0.5%, greater than or equal to about 1%, greater than or equal to about 2%, greater than or equal to about 3%, greater than or equal to about 4%, greater than or equal to about 5%, greater than or equal to about 6%, greater than or equal to about 8%, greater than or equal to about 10%, greater than or equal to about 12%, greater than or equal to about 15%, greater than or equal to about 20%, greater than or equal to about 30%, greater than or equal to about 40%, greater than or equal to about 50%, greater than or equal to about 60%, or greater than or equal to about 70%. Combinations of the above-referenced ranges are also possible (e.g., greater than or equal to about 0% and less than about 20%). Other ranges are also possible.

The loss in breakdown voltage may be determined by measuring the breakdown voltage of the battery separator before and after exposing the battery separator to lead electroplating conditions. Electroplating conditions result in a relatively high concentration of dissolved lead, resulting in an increased probability of dendrite formation. Briefly, electroplating conditions using the following protocol can be used. The battery separator can be incorporated into an electrochemical cell including standard lead foil electrodes as the negative electrode and positive electrode and the electrochemical cell can be operated under overcharging conditions. The separator (e.g., in leaf form) may be positioned between the negative electrode and positive electrode to separate the plates. The electrochemical cell can be filled with distilled water. The cell can be charged at 7 A (i.e., 20 mA/cm$^2$) for 15 minutes. The voltage and temperature of the cell can be monitored at one minute intervals. After 15 minutes, the electroplating can be stopped. The separator can be removed from the assembly of electrodes and washed with distilled water. The separator can be dried at 80° C. in an oven for 20 minutes. The breakdown voltage may then be determined as described above and compared with the breakdown voltage prior to exposure to electroplating conditions to determine the percent loss in BDV.

As an example, in one set of embodiments, a battery separator comprises a non-woven web comprising a plurality of glass fibers having an average diameter of greater than or equal to about 0.1 microns and less than or equal to about 15 microns, wherein the glass fibers are present in an amount of greater than or equal to about 2 wt. % and less than or equal to about 100 wt. % of the non-woven web (e.g., greater than or equal to about 2 wt. % and less than or equal to about 95 wt. % of the non-woven web). The battery separator may have a mean flow pore size of greater than or equal to about 0.2 microns (e.g., greater than or equal to about 0.5 microns, greater than or equal to about 1.0 microns) and less than or equal to about 30 microns (or any other suitable range for mean flow pore size as described herein). For example, the mean flow pore size may be less than or equal to about 60 microns, less than or equal to about 50 microns, less than or equal to about 45 microns, less than or equal to about 40 microns, less than or equal to about 30 microns, less than or equal to about 25 microns, less than or equal to about 20 microns, less than or equal to about 15 microns, less than or equal to about 10 microns, or less than or equal to about 5 microns, less than or equal to about 3 microns, less than or equal to about 2 microns, less than or equal to about 1 micron, less than or equal to about 0.8 microns, less than or equal to about 0.5 microns, or less than or equal to about 0.2 microns; and/or greater than or equal to about 0.1 microns, greater than or equal to about 0.2 microns, greater than or equal to about 0.5 microns, greater than or equal to about 0.8 microns, greater than or equal to about 1 micron, greater than or equal to about 2 microns, greater than or equal to about 5 microns, greater than or equal to about 10 microns, greater than or equal to about 15 microns, greater than or equal to about 20 microns, greater than or equal to about 25 microns, greater than or equal to about 30 microns, greater than or equal to about 35 microns, greater than or equal to about 50 microns or greater than or equal to about 60 microns. The battery separator may have a percent loss of breakdown voltage of less than or equal to about 80% (or any other suitable range for percent loss of breakdown voltage as described herein). For example, the battery separator may have a percent loss of breakdown voltage of less than or equal to about 75%, less than or equal to about 70%, less than or equal to about 65%, less than or equal to about 60%, less than or equal to about 55%, less than or equal to about 50%, less than or equal to about 45%, less than or equal to about 40%, less than or equal to about 35%, less than or equal to about 30%, less than or equal to about 25%, less than or equal to about 20%, less than or equal to about 15%, less than or equal to about 10%, less than or equal to about 8%, less than or equal to about 5%, less than or equal to about 3%, less than or equal to about 3%, or less than or equal to about 1%; and/or greater than or equal to about 0%, greater than or equal to about 0.05%, greater than or equal to about 0.1%, greater than or equal to about 0.2%, greater than or equal to about 0.5%, greater than or equal to about 1%, greater than or equal to about 2%, greater than or equal to about 3%, greater than or equal to about 4%, greater than or equal to about 5%, greater than or equal to about 6%, greater than or equal to about 8%, greater than or equal to about 10%, greater than or equal to about 12%, greater than or equal to about 15%, greater than or equal to about 20%, greater than or equal to about 30%, greater than or equal to about 40%, greater than or equal to about 50%, greater than or equal to about 60%, or greater than or equal to about 70%.

The battery separator may include sulfate salts in some embodiments, but in other embodiments do not include any sulfate salts. Other configurations are also possible.

As described herein, in some embodiments a non-woven web and/or battery separator includes a sulfate compound. Methods of adding a sulfate compound to a non-woven web and/or battery separator are described in more detail below.

In another set of embodiments, a battery separator includes one or more heavy metal scavengers such as a rubber. The heavy metal scavenger may be present in certain embodiments in which one or more electrodes of the battery comprises a heavy metal (e.g., a lead antimony alloy electrode). The heavy metal scavenger (e.g., a rubber) may prevent or reduce the amount of heavy metals depositing on the one or more electrodes. In some embodiments, the battery separator and/or a non-woven web within the battery separator may comprise a rubber as a heavy metal scavenger. The rubber may dissolve in the electrolyte and may scavenge or bind with heavy metals, such as Sb, thereby removing the heavy metal before it irreversibly deposits on an electrode surface (e.g., negative electrode surface) and/or before it increases water consumption. In some such cases, a battery separator including a non-woven web comprising a rubber (e.g. rubber particles) as described herein may increase antimony suppression and/or reduce water consumption during operation of a battery including the battery separator, compared to a battery including a separator lacking the rubber or having a lower concentration of the rubber, all other factors being equal.

In some embodiments, the water consumption of a battery separator comprising a rubber may be less than or equal to about 10 g/AH, less than or equal to about 9 g/AH, less than or equal to about 8 g/AH, less than or equal to about 7 g/AH, less than or equal to about 6 g/AH, less than or equal to about 5 g/AH, less than or equal to about 4 g/AH, less than or equal to about 3 g/AH, less than or equal to about 2 g/AH, or less than or equal to about 1 g/AH. In some instances, the water consumption of a battery separator comprising a rubber may be greater than or equal to about 0.5 g/AH, greater than or equal to about 1 g/AH, greater than or equal to about 2 g/AH, greater than or equal to about 3 g/AH, greater than or equal to about 4 g/AH, greater than or equal to about 5 g/AH, greater than or equal to about 6 g/AH, greater than or equal to about 7 g/AH, or greater than or equal to about 8 g/AH. Combinations of the above-referenced ranges are also possible (e.g., greater than or equal to about 1 g/AH and less than or equal to about 10 g/AH, greater than or equal to about 2 g/AH and less than or equal to about 5 g/AH). Water consumption may be determined by following the VRLA SLI Batteries (AGM) Requirements test, VDA Requirement Specification AGM: 2010-03 Method 9.10, e.g., using H8 European Automotive battery with a capacity of 100 AH.

The antimony suppression produced by a battery separator may be determined by determining the recharge efficiency (i.e., capacity taken in vs. capacity taken out) using the protocol described in "Antimony Suppression Analysis", R. Wimberly and G. Brilmyer in "The Battery Man", August 2000, pp. 28-35. In some embodiments, the recharge efficiency of a battery comprising a battery separator comprising a non-woven web including a rubber may be greater than or equal to about 6%, greater than or equal to about 7%, greater than or equal to about 8%, greater than or equal to about 9%, greater than or equal to about 10%, greater than or equal to about 12%, greater than or equal to about 15%, greater than or equal to about 18%, greater than or equal to about 20%, greater than or equal to about 22%, greater than or equal to about 25%, greater than or equal to about 28%, greater than or equal to about 30%, or greater than or equal to about 40%. In some cases, the recharge efficiency of a battery comprising a battery separator comprising a non-woven web including a rubber may be less than or equal to about 40%, less than or equal to about 38%, less than or equal to about 35%, less than or equal to about 32%, less than or equal to about 30%, less than or equal to about 28%, less than or equal to about 25%, less than or equal to about 22%, less than or equal to about 20%, less than or equal to about 18%, less than or equal to about 15%, less than or equal to about 12%, less than or equal to about 10%, or less than or equal to about 8%. Combinations of the above-referenced ranges are also possible. In some embodiments, the recharge efficiency is greater than or equal to about 6% (e.g., greater than or equal to about 10%).

In general, any suitable rubber that is able to scavenge antimony and that does not adversely affect battery performance may be used. Non-limiting examples of suitable rubbers include natural rubbers (e.g., smoked sheet, pale crepes, blanket crepes, brown crepes, amber or flat bark crepes, *Hevea brasiliensis* rubber, latex of natural rubber) and synthetic rubbers (e.g., styrene-butadiene rubbers, polybutyldiene, polyisoprene, styrene butadiene, nitrile, butyl, ethylene-propylene, silicone, polysulfide, polyacrylate). In some cases, the rubber may be cured. In other cases, the rubber may be uncured. In some embodiments, the rubber may in the form of, or may be included in, a binder resin, and the rubber may be used to bind one or more components of the non-woven web together. In other embodiments, the rubber does not serve to bind components of the non-woven web together and may function primarily as a heavy metal scavenger and/or carrier for another chemical additive (e.g., an antioxidant).

In some embodiments, the rubber may be in the form of a particle. The average particle size (e.g., average diameter, or average cross-sectional dimension) of the rubber particles included in a non-woven web and/or separator described herein may be, for example, greater than or equal to about 1 micron, greater than or equal to about 3 microns, greater than or equal to about 5 microns, greater than or equal to about 10 microns, greater than or equal to about 20 microns, greater than or equal to about 30 microns, greater than or equal to about 40 microns, greater than or equal to about 50 microns, greater than or equal to about 60 microns, greater than or equal to about 70 microns, greater than or equal to about 80 microns, or greater than or equal to about 90 microns. The particles may have an average particle size of, for example, less than or equal to about 100 microns, less than or equal to about 90 microns, less than or equal to about 80 microns, less than or equal to about 70 microns, less than or equal to about 60 microns, less than or equal to about 50 microns, less than or equal to about 40 microns, less than or equal to about 30 microns, less than or equal to about 20 microns, less than or equal to about 10 microns, or less than or equal to about 5 microns. Combinations of the above-referenced ranges are also possible (e.g., greater than or equal to about 1 micron and less than or equal to about 100 microns, greater than or equal to about 3 micron and less than or equal to about 20 microns). Other ranges are also possible.

In some embodiments, the choice of average particle size of the rubber particles may depend at least in part on the method in which the rubber particles are added to the non-woven web. For example, in some embodiments, fine rubber particles (e.g., less than or equal to about 20 microns) may be used when the rubber particles are added to the non-woven web via electrostatic attraction of the rubber particles to one or more oppositely charged component(s) of the non-woven web. Methods of adding a rubber compound to a non-woven web and/or battery separator are described in more detail below.

In some embodiments, the total weight percentage of rubbers in the non-woven web and/or battery separator may be greater than or equal to about 1 wt. %, greater than or equal to about 2 wt. %, greater than or equal to about 5 wt. %, greater than or equal to about 10 wt. %, greater than or equal to about 15 wt. %, greater than or equal to about 20 wt. %, greater than or equal to about 25 wt. %, greater than or equal to about 30 wt. %, greater than or equal to about 35 wt. %, greater than or equal to about 40 wt. %, greater than or equal to about 45 wt. %, greater than or equal to about 50 wt. %, greater than or equal to about 55 wt. %, greater than or equal to about 60 wt. %, or greater than or equal to about 65 wt. %.

In some cases, the total weight percentage of rubbers in the non-woven web and/or battery separator may be less than or equal to about 70 wt. %, less than or equal to about 65 wt. %, less than or equal to about 60 wt. %, less than or equal to about 55 wt. %, less than or equal to about 50 wt. %, less than or equal to about 45 wt. %, less than or equal to about 40 wt. %, less than or equal to about 35 wt. %, less than or equal to about 30 wt. %, less than or equal to about 25 wt. %, less than or equal to about 20 wt. %, less than or equal to about 15 wt. %, less than or equal to about 10 wt. %, less than or equal to about 8 wt. %, less than or equal to about 5 wt. %, less than or equal to about 3 wt. %, less than or equal to about 2 wt. %, or less than or equal to about 1 wt. %. Combinations of the above-referenced ranges are also possible (e.g., a total weight percentage of rubbers of greater than or equal to about 1 wt. % and less than about 70 wt. %, greater than or equal to about 2 wt. % and less than about 20 wt. %). Other ranges are also possible.

The total weight percentage of rubbers in the non-woven web and/or battery separator is based on the dry solids and can be determined prior to adding the rubbers to the non-woven web and/or battery separator.

One or more rubbers may be present in any suitable form in the non-woven web. In some embodiments, the rubber may be part of a resin that is coated on at least portions of the non-woven web. In other embodiments, the rubber may be coated on at least portions of the non-woven web without a resin.

In some embodiments, a rubber (e.g., rubber particles) included in a non-woven web and/or battery separator described herein includes one or more antioxidants, as described in more detail below.

As noted above, in some embodiments, a non-woven web may include one or more antioxidants. The antioxidant(s) may reduce or prevent oxidation of organic material (e.g., synthetic fibers, binder resin, and other chemical additives such as a rubber) in the non-woven web and/or battery separator. In general, oxidation can degrade the non-woven web and reduces the mechanical integrity of the battery separator. In lead acid batteries, any carbon-based polymer (e.g., rubber, polyethylene) in the non-woven web and/or battery separator containing carbon-carbon single bonds across its main chain may be susceptible to oxidative damage. The carbon-carbon single bonds may be susceptible to thermo-oxidative cleavage, as a consequence of their ability to undergo free-radical cleavage reactions. Some carbon-based polymers in the non-woven web and/or battery separator may break down in an oxidative environment and form alkoxy radicals followed by hydroperoxide and peroxy radicals. The formation of these radicals can reduce the performance of the battery.

In some instances, an antioxidant described herein may reduce the rate of oxidation of organic material in the non-woven web and/or battery separator. In certain embodiments, the combination of a rubber and an antioxidant may have a synergistic effect on chemical stability and/or battery performance. For instance, the antioxidant may prevent oxidation of the rubber, which scavenges heavy metals that might otherwise adversely affect battery performance.

In some embodiments, a battery separator comprising a non-woven web including one or more antioxidants may be resistant to oxidation and, accordingly, may have a relatively long life time (e.g., a long time to failure). In some embodiments, the time to failure of the battery separator may be greater than or equal to about 5 hours, greater than or equal to about 10 hours, greater than or equal to about 25 hours, greater than or equal to about 50 hours, greater than or equal to about 100 hours, greater than or equal to about 250 hours, greater than or equal to about 500 hours, greater than or equal to about 750 hours, greater than or equal to about 1,000 hours, greater than or equal to about 1,250 hours, greater than or equal to about 1,500 hours, or greater than or equal to about 1,750 hours. In certain embodiments, the time to failure of the battery separator may be less than or equal to about 2,000 hours, less than or equal to about 1,750 hours, less than or equal to about 1,500 hours, less than or equal to about 1,250 hours, less than or equal to about 1,000 hours, less than or equal to about 750 hours, less than or equal to about 500 hours, less than or equal to about 250 hours, less than or equal to about 100 hours, or less than or equal to about 50 hours. Combinations of the above-referenced ranges are also possible (e.g., greater than about 5 hours and less than or equal to about 2,000 hours, greater than about 100 hours and less than or equal to about 1,000 hours). Other values are also possible. The time to failure may be measured by performing an electrochemical oxidation test according to the standard IS 6071-1986. Briefly, in an electrochemical oxidation test, the battery separator is exposed to overcharging conditions. As a result, oxygen evolves at the positive electrode, which produces oxidizing conditions that can degrade the battery separator. Failure is defined as the time at when the measured voltage across the battery separator is 0V.

In some embodiments, a battery separator comprising a non-woven web including one or more antioxidants may have better mechanical stability over time compared to a battery separator lacking the one or more antioxidants, all other factors being equal. For instance, in some embodiments, the tensile strength in the machine direction of a battery separator comprising a non-woven web including one or more antioxidants, after exposure to hydrogen peroxide as defined in the protocol BCIS 03B Rev March 2010 Method 22 Chemical/Oxidation Resistance by Hydrogen Peroxide, may be of greater than or equal to about 10 $kg/cm^2$, greater than or equal to about 15 $kg/cm^2$, greater than or equal to about 20 $kg/cm^2$, greater than or equal to about 30 $kg/cm^2$, greater than or equal to about 40 $kg/cm^2$, greater than or equal to about 50 $kg/cm^2$, greater than or equal to about 60 $kg/cm^2$, greater than or equal to about 70 $kg/cm^2$, or greater than or equal to about 75 $kg/cm^2$. In some instances, the tensile strength may be less than or equal to about 80 $kg/cm^2$, less than or equal to about 70 $kg/cm^2$, less than or equal to about 60 $kg/cm^2$, less than or equal to about 50 $kg/cm^2$, less than or equal to about 40 $kg/cm^2$, less than or equal to about 30 $kg/cm^2$, less than or equal to about 20 kg/cm², or less than or equal to about 15 kg/cm². Combinations of the above-referenced ranges are also possible (e.g., greater than or equal to about 10 kg/cm² and less than or equal to about 80 kg/cm², greater than or equal to about 15 kg/cm² and less than or equal to about 60 kg/cm²). The tensile strength may be determined using BCIS 03B Rev March 2010 Method 4.

In some embodiments, the puncture strength (or puncture resistance) of a battery separator comprising a non-woven web including one or more antioxidants, or the puncture strength (or puncture resistance) of the non-woven web itself, after exposure to hydrogen peroxide as defined in the protocol BCIS 03B Rev March 2010 Method 22, may be greater than or equal to about 1 N, greater than or equal to about 1.5 N, greater than or equal to about 2 N, greater than or equal to about 3 N, greater than or equal to about 5 N, greater than or equal to about 8 N, greater than or equal to about 10 N, greater than or equal to about 12N, or greater than or equal to about 15 N. In some instances, the puncture strength (or puncture resistance) may be less than or equal to about 20 N, less than or equal to about 18 N, less than or equal to about 15 N, less than or equal to about 12 N, less than or equal to about 10 N, less than or equal to about 8 N, less than or equal to about 5 N, or less than or equal to about 3 N. Combinations of the above-referenced ranges are also possible (e.g., greater than or equal to about 1 N and less than or equal to about 20 N, greater than or equal to about 1.5 N and less than or equal to about 15 N). The puncture strength may be determined using protocol BCIS 03B Rev March 2010 Method 9. The puncture resistance may be determined using BCIS 03B Rev March 2010 Method 10.

In some embodiments, at least a portion of the antioxidant, if present, may be immobilized on at least a portion of the non-woven web and/or within a carrier (e.g., rubber particle) present in the non-woven web. In some instances, substantially all of the antioxidant included in a battery separator may be immobilized on at least a portion of the non-woven web or within a carrier (e.g., a rubber particle) present in the non-woven web, e.g., as opposed to within an electrolyte present in the pores of the battery separator. In some embodiments, an antioxidant that is immobilized with respect to the non-woven web and/or a carrier may be retained in or on the non-woven web and/or carrier during and/or after use (e.g., cycling of a battery including the non-woven web). For instance, in some embodiments, a substantial amount of the antioxidant may remain in or on the non-woven web after extended battery operation (e.g., during the lifetime of the battery) and/or after subjecting the non-woven web to the electrolyte. In other embodiments, at least a portion of the antioxidant is not immobilized on the non-woven web and/or on/within a carrier after exposure to the electrolyte, and in such embodiments, the antioxidant may leach out of the non-woven web and into the electrolyte.

In certain embodiments, immobilization of the antioxidant on at least a portion of the non-woven web and/or on/in a carrier (e.g., a rubber particle) may protect the non-woven web and/or particle from adverse interactions with species in the electrolyte. Without being bound by theory, the immobilized antioxidant may neutralize oxidants that are in close proximity to organic material in the non-woven and/or battery separator. In certain embodiments, the immobilized antioxidant may alter the local concentration of oxidants in the vicinity of the organic material. Immobilization may prevent or reduce the amount of antioxidant that diffuses into the electrolyte. Conversely, a mobile antioxidant (i.e., an antioxidant that is not immobilized in or on the web) may diffuse into the electrolyte, and in some cases, may react with oxidants in the bulk electrolyte. In some such embodiments, a relatively high concentration of mobile antioxidant may be needed to neutralize enough oxidants to protect the non-woven web and/or battery separator from adverse interactions, compared to a relatively lower concentration of antioxidant that is immobilized on/within the non-woven web. In some instances, at least a portion of the antioxidant (e.g., substantially all) included in a battery separator may be immobilized on at least a portion of the non-woven web and/or in a carrier present in the non-woven web. In some cases, the antioxidant may be sterically trapped within a part of a resin that is immobilized on the non-woven web and/or sterically trapped in a carrier present in the non-woven web.

In general, any suitable antioxidant may be used. Non-limiting examples of antioxidants include sulfur compounds (e.g., glutathione, 2-mercaptobenzimidazole, sulfonamide), phenols (e.g., butylatedhydroxytoluene, butlyatedhydroxyanisole, styrenated phenol), hydroquinoline, amines (e.g., phenlyenediamines, 2,6-di-tert-butyl-4-methylphenol, scetone/diphenylamine condensates, octylated diphenylamine, 4,4'-di(dimethylbenzyl)diphenylamine, polymerized 1,2-dihydro-2,2,4-trimethylquinolline, N-iso-propyl-N-p-phenylenediamine, p-Phenylenediamine, diaryl-phenylenediamines, N,N'-bis-(1-Ethyl-3-methylpentyl) p-phenylenediamine, N,N'-bis-(1-Methyl Heptyl) p-phenylenediamine, N,N'-bis-(1,4-dimethyl pentyl) p-phenylenediamine, analine-hydroquinone-o-toluidine reaction products, xylidines-hydroquinone-o-toluidine reaction products, N-isopropyl-N'-phenyl-p-phenylenediamine, n-1,3-dimethyl butyl-N'-phenylene-p-phenylenediamine, n,1-methyl heptyl-N'-[henyl-p-phenylenediamine]), vitamins and vitamin analogs (e.g., vitamin A, vitamin C, vitamin E), phosphorous compounds (e.g., phytic acid, tris(nonylphenyl) phosphite), ubiquinol, uric acid, melatonin, butyl zimate, isobutyl niclate, methyl niclate, and combinations thereof In some embodiments, the total weight percentage of antioxidants in the non-woven web and/or battery separator may be greater than or equal to about 0.05 wt. %, greater than or equal to about 0.06 wt. %, greater than or equal to about 0.08 wt. %, greater than or equal to about 0.1 wt. %, greater than or equal to about 0.2 wt. %, greater than or equal to about 0.5 wt. %, greater than or equal to about 0.8 wt. %, greater than or equal to about 1 wt. %, greater than or equal to about 1.5 wt. %, greater than or equal to about 2 wt. %, greater than or equal to about 2.5 wt. %, greater than or equal to about 3 wt. %, greater than or equal to about 3.5 wt. %, greater than or equal to about 4 wt. %, or greater than or equal to about 4.5 wt. %. In some cases, the total weight percentage of antioxidants in the non-woven web and/or battery separator may be less than or equal to about 5 wt. %, less than or equal to about 4.5 wt. %, less than or equal to about 4 wt. %, less than or equal to about 3.5 wt. %, less than or equal to about 3 wt. %, less than or equal to about 2.5 wt. %, less than or equal to about 2 wt. %, less than or equal to about 1.5 wt. %, less than or equal to about 1 wt. %, less than or equal to about 0.8 wt. %, less than or equal to about 0.5 wt. %, less than or equal to about 0.2 wt. %, or less than or equal to about 0.1 wt. %. Combinations of the above-referenced ranges are also possible (e.g., a total weight percentage of antioxidants of greater than or equal to about 0.05 wt. % and less than about 5 wt. %, greater than or equal to about 0.1 wt. % and less than about 1 wt. %). Other ranges are also possible. The total weight percentage of antioxidants in the non-woven web and/or battery separator is based on the dry solids of the non-woven web and/or battery separator, and can be determined prior to adding the antioxidant to the non-woven web and/or battery separator.

In some embodiments, an antioxidant may be included in a rubber (e.g., rubber particles) present in a non-woven web. A rubber (e.g., rubber particles) may have any suitable weight percentage of antioxidant included therein. For instance, in some embodiments, the weight percentage of antioxidant in the rubber may be greater than or equal to about 0.01 wt. %, greater than or equal to about 0.02 wt. %, greater than or equal to about 0.03 wt. %, greater than or equal to about 0.04 wt. %, greater than or equal to about 0.06 wt. %, greater than or equal to about 0.08 wt. %, greater than or equal to about 0.1 wt. %, greater than or equal to about 0.2 wt. %, greater than or equal to about 0.5 wt. %, or greater than or equal to about 1 wt. %. In some instances, the weight percentage of antioxidant in the rubber may be less than or equal to about 2 wt. %, less than or equal to about 1.5 wt. %, less than or equal to about 1.2 wt. %, less than or equal to about 1 wt. %, less than or equal to about 0.8 wt. %, less than or equal to about 0.6 wt. %, less than or equal to about 0.5 wt. %, or less than or equal to about 0.4 wt. %. Combinations of the above-referenced ranges are also possible (e.g., greater than or equal to about 0.01 wt. % and less than or equal to about 2 wt. %, greater than or equal to about 0.1 wt. % and less than or equal to about 1 wt. %). Other values of weight percentage of antioxidant in the resin are also possible. The weight percentage of antioxidant in the rubber is based on the dry rubber and can be determined prior to incorporating the rubber into the non-woven web.

It should be understood that a battery separator described herein can contain any suitable number and/or types of additives (or no additives at all). In some embodiments, a battery separator may comprise two or more of the same type of chemical additives. For instance, a nonwoven web may comprise two sulfate salts (e.g., calcium sulfate and magnesium sulfate), two antioxidants, or two rubbers. In some embodiments, a battery separator may comprise a non-woven web comprising different types of chemical additives. For instance, a battery separator may comprise a non-woven web comprising two different types of chemical additives (e.g., rubber and antioxidant, rubber and sulfate salt, or sulfate salt and antioxidant) or three different types of chemical additives (e.g., rubber, antioxidant, and sulfate salt). Other combinations are also possible.

In one example, a battery separator may include a non-woven web comprising a sulfate salt (e.g., magnesium sulfate, calcium sulfate) and a rubber (e.g., natural rubber). In some such embodiments, the non-woven and/or battery separator may include greater than or equal to about 0.5 wt. % and less than or equal to about 15 wt. % of a rubber and greater than or equal to about 1 wt. % and less than or equal to about 10 wt. % of a sulfate salt. The non-woven may also include glass fibers (e.g., greater than or equal to about 5 wt. % and less than or equal to about 50 wt. %), synthetic fibers (greater than or equal to about 15 wt. % and less than or equal to about 35 wt. %), inorganic particles (greater than or equal to about 30 wt. % and less than or equal to about 60 wt. %), and optionally binder resin (greater than or equal to about 0.5 wt. % and less than or equal to about 15 wt. %). The synthetic fibers may include multi-component fibers, such as bi-component fibers (e.g., greater than or equal to about 15 wt. % and less than or equal to about 25 wt. %), and/or monocomponent fibers (greater than or equal to about 5 wt. % and less than or equal to about 15 wt. %) that have a relatively large average diameter (e.g., greater than or equal to about 5 microns and less than or equal to about 20 microns). The inorganic particles (e.g., silica) may have a relatively small particle size (e.g., greater than or equal to about 4 microns and less than or equal to about 12 microns), and/or, in some embodiments, may have a relatively high surface area (e.g., greater than or equal to about 10 m$^2$/g and less than or equal to about 2,000 m$^2$/g, greater than or equal to about 400 m$^2$/g and less than or equal to about 600 m$^2$/g). In some instances, the battery separator including a non-woven web comprising a sulfate salt and a rubber may have a basis weight of greater than or equal to about 30 g/m$^2$ and less than or equal to about 500 g/m$^2$ (e.g., greater than or equal to about 50 g/m$^2$ and less than or equal to about 150 g/m$^2$). In some cases, the non-woven web may be a planar non-woven web.

Figure 3A:
FIG. 3A is a schematic diagram of the thickness and overall thickness of a planar layer that can be included in a battery separator according to one set of embodiments.
Figure 3B:
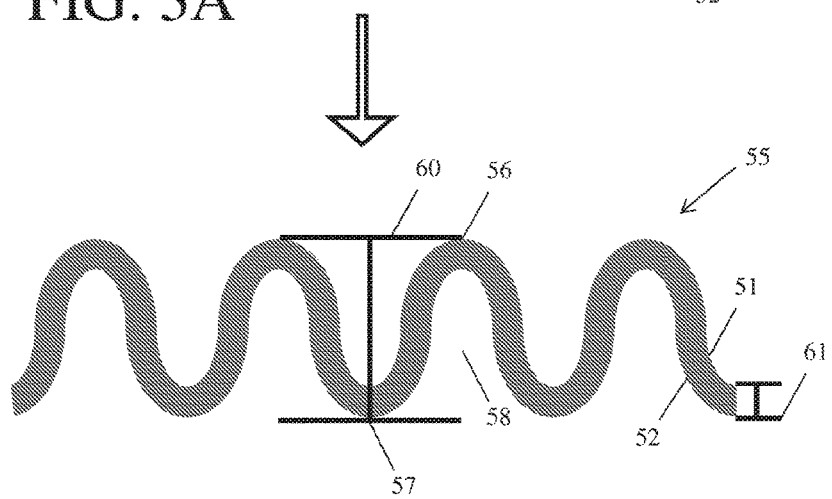
FIG. 3B is a schematic diagram of the thickness and overall thickness of a non-planar layer that can be included in a battery separator according to one set of embodiments.

In certain embodiments, the battery separator may include a non-woven web (e.g. a planar non-woven web or a non-woven web including at least one non-planar surface) and an additional layer that has at least one non-planar surface (e.g., includes undulations). As used herein a "non-planar layer" refers to a layer that includes repeated undulations and/or has at least one non-planar surface. An undulating layer (i.e., a layer that includes undulations) refers to a layer that includes repeated bends that distorts both the top and bottom face of the layer in a similar manner. For instance, a cross-section of a bend or curve of the layer will have a top line 56 that is parallel to the bottom line 57, e.g., as shown in FIG. 3B. In some embodiments, the size or amplitude of the bends or curves may be on the order of the thickness of the layer (e.g., 0.1-2 times the thickness of the layer) or greater, as described in more detail below. The bends or curves in the undulating layer may be irregular or regular. In some embodiments, the undulating layer may have a wavelike form. Examples of such layers include corrugated layers, pleated layers, and crimped layers, amongst others.

As described herein, a battery separator may comprise a layer having a relatively low apparent density. As used herein, apparent density has its ordinary meaning in the art and may be represented by the following equation.

$$\text{Apparent density (g/m}^2\text{×mm)} = \text{Basis weight (g/m}^2\text{)} \div \text{Overall thickness (mm)}$$

As illustrated by the equation, apparent density is a measure of the mass of the layer divided by the volume (i.e., area times overall thickness) of the layer that includes any unoccupied space within the outermost boundaries of the layer, also referred to as voids.

The overall thickness is measured according to BCIS-03A under 10 kPa as described in more detail below. The voids of the layer are accounted for in the overall thickness. FIG. 3 shows the difference between overall thickness and thickness for a layer having planar surfaces (e.g., planar layer 50) and a layer having at least one non-planar surface and/or that includes undulations (e.g., non-planar layer 55). The overall thickness 60, as well as thickness 61, of the planar layer is measured along surfaces 51 and 52 as shown in FIG. 3A. The overall thickness and thickness for the planar layer are the same. FIG. 3B shows planar layer 50 after undergoing a shaping process (e.g., corrugation, embossing, pleating) to form a non-planar layer 55, which has the same thickness 61 as planar layer 50. The thickness 61 of non-planar layer 55 is also measured from surfaces 51 and 52. The overall thickness 60, however, is measured from outermost surfaces 56 and 57, which are the most external surfaces of the layer. As shown in FIG. 3B, the overall thickness takes into account voids 58 in the layer. Thus, the thickness of the layer refers to the thickness of the material used to form the layer while the overall thickness refers to the spatial thickness of the layer.

In some embodiments, the apparent density of a layer may be lowered by increasing the overall thickness of the layer as shown illustratively in FIG. 3 (or by increasing the overall thickness of the layer by a factor larger than a factor of the layer's increase in basis weight). For example, planar layer 50 may have an overall thickness of 2 mm prior to any shaping process. After subjecting the layer to a shaping process, the layer may have a non-planar surface and/or undulations in the layer. The non-planar layer may have an overall thickness 60 (e.g., 10 mm) greater than the overall thickness 60 of the layer prior to shaping. In this example, the basis weight of layer 55 in FIG. 3B would be greater than the basis weight of layer 50 in FIG. 3A for the same size/area layer (e.g., 10 cm×10 cm); however, as long as the proportional increase in thickness of layer 55 is larger than its proportional increase in basis weight, the apparent density of layer 55 would be lower than its apparent density prior to shaping (e.g., layer 50 of FIG. 3A). For example, layer 55 of FIG. 3B having an increase in overall thickness by a factor of 5 (e.g., 2 mm to 10 mm) and an increase in basis weight by a factor of about 1.33 (e.g., 300 g/m$^2$ to 400 g/m$^2$), would have an apparent density that is lower by a factor of 3.75 (e.g., 150 g/m$^2$ mm to 40 g/m$^2$ mm) compared to that for layer 50 of FIG. 3A.

In some embodiments, a battery separator including a layer having a relatively low apparent density may result in a battery arrangement having a relatively high total void volume between the electrodes. As used herein, total void volume of a layer has its ordinary meaning in the art and refers to the empty (i.e., void) volume, e.g., that is capable of being filled with matter (e.g., an electrolyte). The total void volume includes the internal void volume and the external void volume. The internal void volume refers to the volume within the internal voids (e.g., pores) in the layer itself; that is the empty (i.e., void) volume within the outermost boundaries of the layer, e.g., that is capable of being filled with matter (e.g., an electrolyte). The external void volume refers to the volume within the external voids (e.g., the volume under a bend in the layer) formed as a result of the shape of the layer. The total void volume percentage, also referred to as the total volume porosity, may be determined using the following formula:

% Total Volume Porosity=100−(Basis weight/(Matter density×overall thickness))

where matter density refers to the density of the components forming the separator/layer (e.g., fibers), e.g., as measured by BCIS-03A, September-9 Method 11. For example, the matter density for a battery separator containing only glass fibers would be the density of the glass fibers. The matter density of a battery separator comprising a mixture of fibers, inorganic particles, and binder resin would be would be a weighted average of the density of each material in the battery separator.

The internal volume porosity percent may be determined according to the standard BCIS-03B—Method 6, which is a volume displacement method.

Non-limiting examples of void volumes within battery separators comprising a conventional planar layer, a conventional ribbed layer, or non-planar layers of the present disclosure are shown in FIG. 4. FIG. 4A shows a cross-section of a battery arrangement comprising a conventional planar battery separator 70 positioned between and in direct contact with a negative electrode 75 and a positive electrode 80. When a battery separator is configured between (e.g., in direct contact with) a negative electrode and a positive electrode, the external void volume refers to the volume between the negative electrode and the surface of the battery separator closest to the negative electrode, and the volume between the positive electrode and the surface of the battery separator closest to the positive electrode that is void prior to addition of the electrolyte. In FIG. 4A, the entire surface area of the negative electrode and the positive electrode are in contact with the planar battery separator. Thus, in this illustration, the total volume porosity is equal to the internal void volume (i.e., internal volume porosity) of the battery separator. In embodiments in which the total volume porosity of the battery separator is equal to the internal volume porosity of the battery separator, the majority of ion movement occurs within the battery separator.

Figure 4A:
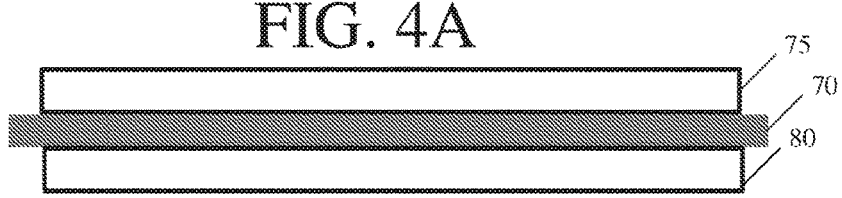
FIGS. 4A-4D are schematic diagrams showing different battery arrangements according to one set of embodiments.
Figure 4B:
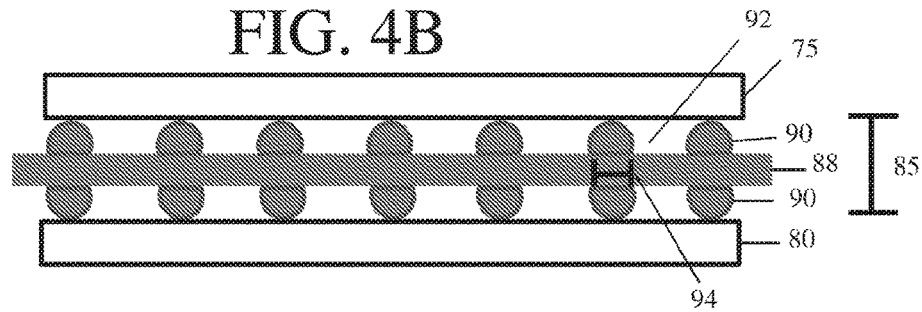

FIG. 4B shows a cross-section of a battery arrangement comprising a conventional battery separator 85 comprising ribs 90 on the top and the bottom surfaces of planar layer 88. Ribs, as shown in FIG. 4B, are material added to at least one surface of the battery separator in a discontinuous arrangement (e.g., the rib material does not form a continuous sheet of material along the whole surface of the layer on which the ribs are positioned). The ribs act as a spacer between the battery separator and the positive electrode and/or negative electrode, and creates unoccupied space (e.g., voids) between the surface of the layer and the surface of the negative electrode and/or positive electrode. This unoccupied space can be used to increase the volume of electrolyte between the electrodes. Movement of ions in the unoccupied space (e.g., "freely" moving ions) is not hindered by the battery separator and thus serves to lower electrical resistance. The unoccupied space may also serve to minimize dendrite formation because it is easier for dendrites to grow on solid material, such as the fibers of the separator where there are more potential points of attachment, than to grow in a liquid (e.g., electrolyte) where there is active ionic conduction. However, since ribs are additional material added to at least one surface of the battery separator, some conventional ribs may block at least a portion of the separator's pores and increase the electrical resistance of the battery separator. Conventional ribs may also reduce the surface area of the electrode(s) that is/are in direct contact with the battery separator. The reduction in contact area between the electrode and the separator may result in non-uniform pressure distribution across the electrodes and may increase shedding of active material from areas of the electrode that are not in contact with the ribs.

Referring back to FIG. 4B, battery separator 85 may be positioned between negative electrode 75 and positive electrode 80, such that the ribs are in contact with electrodes but the top and bottom surfaces of planar layer 88 are not in direct contact with the electrodes. The presence of the ribs creates voids 92 that can allow ions within the void volume to move "freely" without interference of portions of the battery separator. In this configuration, the void volume will depend on the size (e.g., height, width) of the ribs. In some instances, ribs 90 may block portions 94 of layer 88 and hinder the movement of ions through those portions of the layer. Moreover, since the ribs have a different surface area than layer 88, and may have a different composition than layer 88, the chemical stability and/or mechanical properties of the ribs may differ from those of the layer. That is, ribs may change the overall chemical stability and mechanical properties of the battery separator. The use of ribs can also be costly since additional material used to form the ribs and an additional process step of adding the ribs to the separator are typically needed.

In some embodiments, a battery separator described herein having at least one non-planar surface and/or including undulations may have advantages of a separator including ribs (e.g., increase in void volume and freely moving ions), but without (or reduced degree of) certain limitations of the ribs (e.g., electrical resistance and/or shedding of active material from areas of the electrode that are not in contact with the ribs). It is noted that a non-planar layer and/or a surface that includes undulations, as described herein, does not encompass a planar layer including ribs alone like that shown in FIG. 4B, though a non-planar layer and/or a surface that includes undulations is not precluded from including ribs.

Figure 4C:
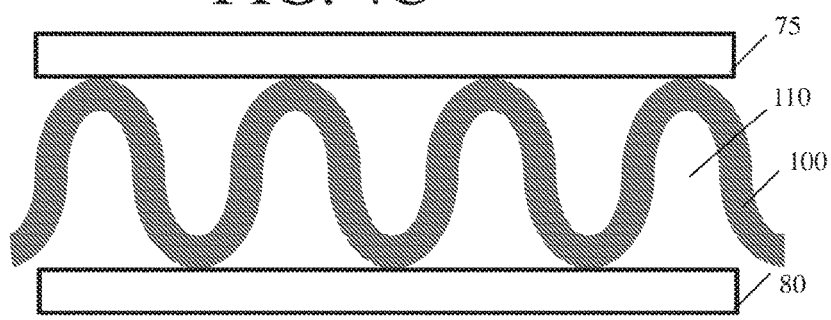
Figure 4D:
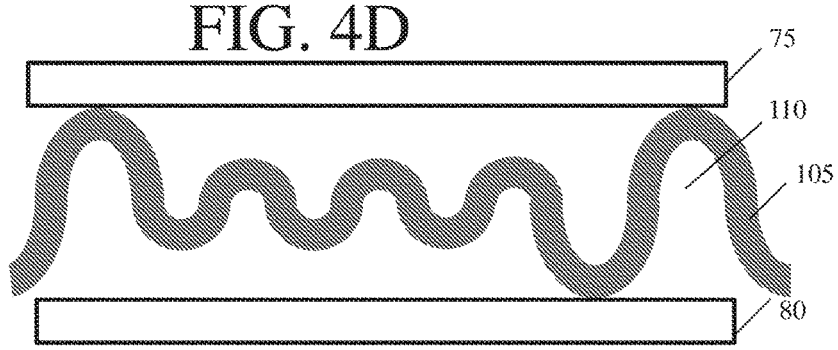

Examples of a battery separator including a layer having at least one non-planar surface and/or including undulations are shown in FIGS. 4C-4D. As shown illustratively in these figures, each of the battery separators may be a layer having two non-planar (opposing) faces. In some instances, the layer may have a patterned shape. For instance, layer 100 may comprise a regular pattern as in FIG. 4C. In certain embodiments, layer 105 may have an irregular pattern as shown in FIG. 4D. In both FIGS. 4C and 4D, the undulating layers include repeated bends and/or curves that distort both the top and bottom face of the layer in a similar manner. Regardless of whether the pattern or shape of the non-planar layer is regular or irregular, the shape of the layer may create voids 110 that can allow "free" ion movement.

In some embodiments, the shape of the layer may be produced by a process that does not negatively influence the chemical stability and/or mechanical properties of the battery separator (e.g., ion conductivity, chemical stability, mechanical strength).

The shaping of the layer/separator may result in different amounts of surface contact area, i.e., the area of the layer/battery separator in contact with a positive and/or negative electrode (or in direct contact with a planar surface positioned adjacent the battery separator). In some embodiments, the surface contact area percentage of a layer/battery separator may be greater than or equal to about 5%, greater than or equal to about 10%, greater than or equal to about 20%, greater than or equal to about 30%, greater than or equal to about 40%, greater than or equal to about 50%, greater than or equal to about 60%, greater than or equal to about 70%, greater than or equal to about 75%, greater than or equal to about 80%, or greater than or equal to about 90%. In some instances, the surface contact area percentage may be less than 100%, less than or equal to about 90%, less than or equal to about 80%, less than or equal to about 75%, less than or equal to about 70%, less than or equal to about 60%, less than or equal to about 50%, less than or equal to about 40%, less than or equal to about 30%, less than or equal to about 20%, or less than or equal to about 15%. Combination of the above-referenced ranges are also possible (e.g., greater than or equal to about 10% and less than or equal to about 30%). Other values are also possible. In some embodiments, both sides/surfaces of the battery separator may have percentages of surface contact area within one or more of the above-referenced ranges. In certain embodiments, the percentage surface contact area may be measured while applying a pressure of 10 kPa to the layer/battery separator. In other embodiments, the percentage surface contact area may be measured without applying any pressure to the layer/battery separator.

Any suitable method may be used to incorporate a chemical additive into a non-woven web and/or battery separator. In some embodiments, a coating method is used to form a coating comprising a chemical additive on the non-woven web. In some embodiments, a coating process involves introducing a resin (e.g., a binder resin) to a pre-formed fiber layer (e.g., a pre-formed non-woven web formed by a wet-laid process). In some embodiments in which the chemical additive(s) are added to the binder resin, as the fiber layer is passed along an appropriate screen or wire, different components included in the resin, such as an sulfate salts, rubber, and/or antioxidants described herein, which may be in the form of separate emulsions, are added to the fiber layer using a suitable technique. In some cases, each component of the binder resin is mixed as an emulsion prior to being combined with the other components and/or fiber layer. In some embodiments, the emulsion/components included in the binder resin may be pulled through the fiber layer using, for example, gravity and/or vacuum. In some embodiments, one or more of the components included in the binder resin may be diluted with softened water and pumped into the fiber layer. In some embodiments, a binder resin may be applied to a fiber slurry prior to introducing the slurry into a headbox. For example, the binder resin may be introduced (e.g., injected) into the fiber slurry and impregnated with and/or precipitated on to the fibers.

In some embodiments, the binder resin comprising one or more chemical additives may be applied to the non-woven web using a non-compressive coating technique. The non-compressive coating technique may coat the non-woven web, while not substantially decreasing the thickness of the web. In other embodiments, the binder resin may be applied to the non-woven web using a compressive coating technique. Non-limiting examples of coating methods include the use of a slot die coater, gravure coating, screen coating, size press coating (e.g., a two roll-type or a metering blade type size press coater), film press coating, blade coating, roll-blade coating, air knife coating, roll coating, foam application, reverse roll coating, bar coating, curtain coating, champlex coating, brush coating, Bill-blade coating, short dwell-blade coating, lip coating, gate roll coating, gate roll size press coating, melt coating, dip coating, knife roll coating, spin coating, spray coating, gapped roll coating, roll transfer coating, padding saturant coating, and saturation impregnation. Other coating methods are also possible.

After applying the binder resin to the non-woven web, the binder resin may be dried by any suitable method. Non-limiting examples of drying methods include the use of an infrared dryer, hot air oven, steam-heated cylinder, through air dryer, hot air float oven, or any suitable type of dryer familiar to those of ordinary skill in the art.

The binder resin may coat any suitable portion of the non-woven web. In some embodiments, the coating of binder resin may be formed such that the surfaces of the non-woven web are coated without substantially coating the interior of the non-woven web. In some instances, a single surface of the non-woven web may be coated. For example, a top surface or layer of the non-woven web may be coated. In other instances, more than one surface or layer of the non-woven web may be coated (e.g., the top and bottom surfaces or layers). In other embodiments, at least a portion of the interior of the non-woven web may be coated without substantially coating at least one surface or layer of the non-woven web. For example, a middle layer of a non-woven web may be coated, but one or more layers adjacent to the middle layer may not be coated. The coating may also be formed such that at least one surface or layer of the non-woven web and the interior of the non-woven web are coated. In some embodiments, the entire web is coated with the binder resin.

In some embodiments, at least a portion of the fibers and/or other components of the non-woven web may be coated without substantially blocking the pores of the non-woven web. In some instances, substantially all of the fibers and/or other components of the non-woven web may be coated without substantially blocking the pores. Coating the non-woven web using the binder resins described herein may add strength and/or flexibility to the non-woven web, and leaving the pores substantially unblocked may be important for maintaining or improving ion conductivity.

In some embodiments, the chemical additive(s) may be added to the fibers at the wet end and/or deposited on the fibers and/or other components of the non-woven web prior to addition of any binder resin. In some embodiments, chemical additive(s), such as those described herein, may be added to the fiber slurry. In certain embodiments, the chemical additive(s) may be coated on the fibers and/or other components of the non-woven web using a beater addition method. Briefly, in a beater addition method, at least a portion of the fibers and/or other components of the non-woven web are coated with a charged molecule that has an opposite charge (e.g., positive or negative) from the chemical additive to be added. The charged chemical additive is then brought into contact with the oppositely charged non-woven web components, such that an electrostatic interaction forms.

In some embodiments, the non-woven web may include more than one coating. For example, at least a portion of the non-woven web may be coated with a chemical additive and then at least a portion of the non-woven web may be coated with a binder resin.

In some embodiments a method of forming a coated non-woven web includes applying a pre-polymerized and/or uncured resin including one or more chemical additives to a non-woven web. In other embodiments, at least portions of the resin (or components of the resin) may be polymerized or cured after applying the resin to the non-woven web.

Various shaping techniques can be used to form a non-planar or shaped layer described herein. In some embodiments, a shaping technique that allows the geometry of the layer to be controlled without negatively affecting another beneficial property of the layer (e.g., volume porosity) may be used. The shape or geometry of the layer may be altered during and/or after fabrication of the layer. Non-limiting examples of suitable processes include, but are not limited to, corrugation, pleating, embossing creping, and micrexing.

As described herein, shaping of a layer may result in the formation of a non-planar layer (a layer that includes repeated undulations and/or has at least one non-planar surface). The undulating layer may include repeated bends and/or curves (e.g., waves, pleats) that distort both the top and bottom face of the layer in a similar manner. In some embodiments, the average size or amplitude of the bends or curves (e.g., waves, pleats) may be on the order of the average thickness of the layer (e.g., at least 0.1, at least 0.2 times, at least 0.5 times, at least 1 time, at least 2 times) the thickness of the layer, or greater (e.g., at least 4, at least 6, at least 8, at least 10 times the average thickness of the layer). The average size or amplitude of the bends or curves (e.g., waves, pleats) may be, in some instances, less than or equal to 20 times, less than or equal to 15 times, less than or equal to 10 times, less than or equal to 8 times, less than or equal to 5 times, less than or equal to 3 times, less than or equal to 2 times, or less than or equal to 1 time the average thickness of the layer. Combinations of the above-referenced ranges are also possible (e.g., average size or amplitude of at least 1 time and less than or equal to 10 times the average thickness of the layer). Other ranges are also possible.

The frequency of bends and/or curves (e.g., waves, pleats) in a layer may also vary. In some embodiments, a layer described herein (e.g., a non-planar layer, an undulating layer) may have at least 1 bend/100 mm, at least 10 bends/100 mm, at least 50 bends/100 mm, at least 100 bends/100 mm, at least 200 bends/100 mm, at least 300 bends/100 mm, at least 400 bends/100 mm, at least 500 bends/100 mm, at least 600 bends/100 mm, at least 700 bends/100 mm, at least 800 bends/100 mm, or at least 900 bends/100 mm. In certain embodiments, a layer described herein (e.g., a non-planar layer, an undulating layer) may have less than or equal to 1000 bends/100 mm, less than or equal to 900 bends/100 mm, less than or equal to 800 bends/100 mm, less than or equal to 700 bends/100 mm, less than or equal to 600 bends/100 mm, less than or equal to 500 bends/100 mm, less than or equal to 400 bends/100 mm, less than or equal to 300 bends/100 mm, less than or equal to 200 bends/100 mm, less than or equal to 100 bends/100 mm, less than or equal to 50 bends/100 mm, or less than or equal to 10 bends/100 mm. at least 100 bends/100 mm and less than or equal to 1000 bends/100 mm). It should appreciated that the ranges above for bends can also be applied to curves, waves, pleats or other repeated units of shape (e.g., embossed patterns) as described herein.

The percent surface area of the layer that is shaped (i.e., the percent surface area that is non-planar, or at a non-zero angle (e.g., at an angle of greater than or equal to about 5 degrees, at an angle of greater than or equal to about 10 degrees, at an angle of greater than or equal to about 15 degrees), with respect to the plane of the layer) may also vary. In some embodiments, the percent surface area of the layer that is shaped may be greater than or equal to about 5%, greater than or equal to about 10%, greater than or equal to about 20%, greater than or equal to about 30%, greater than or equal to about 40%, greater than or equal to about 50%, greater than or equal to about 60%, greater than or equal to about 70%, greater than or equal to about 75%, greater than or equal to about 80%, or greater than or equal to about 90%. In some instances, the percent surface area of the layer that is shaped may be less than 100%, less than or equal to about 90%, less than or equal to about 80%, less than or equal to about 75%, less than or equal to about 70%, less than or equal to about 60%, less than or equal to about 50%, less than or equal to about 40%, less than or equal to about 30%, less than or equal to about 20%, or less than or equal to about 15%. Combination of the above-referenced ranges are also possible (e.g., greater than or equal to about 10% and less than or equal to about 30%). In some embodiments, both sides/surfaces of the layer may have percentages within one or more of the above-referenced ranges. The percent surface area of the layer that is shaped may be occupied by bends, curves, waves, pleats or other repeated units of shape as described herein.

In some embodiments, corrugation or pleating may be used to shape a layer (e.g., non-woven web). The corrugation or pleating may be performed in the machine direction or cross direction. In some embodiments, corrugation or pleating may result in bends, curves, waves or pleats within the layer having an amplitude, frequency and/or percent surface area of coverage as described herein.

In some embodiments, embossing may be used to shape a layer. Several different techniques may be used to emboss the layer. For example, pressure may be applied to a layer using a roll system to form surface features (e.g., indentations) having a specific pattern. In some instances, the layer may be formed on a wire (e.g., inclined table, flat table, rotoformer, round former) that has a mesh pattern. The mesh pattern may generate zones with more or less pulp and, accordingly, may produce an uneven thickness profile (e.g., indentations) across the layer. In some such embodiments, the indentations may be in the form of a mesh pattern, and may have a depth and/or a percent area coverage in the layer in one or more ranges described herein. In embodiments in which the layer is a wet laid layer, the layer may be embossed during the wet stage using a dandy roll with a defined pattern. An embossed layer may comprise repeated units of one or more shape (e.g., square indentations). The repeated units may have a defined shape, which may be, for example, substantially circular, square, rectangular, trapezoidal, polygonal, or oval in cross-section and/or in plan view (i.e., viewed from above). The shapes may be regular or irregular. Any suitable shape may be embossed onto the layer.

In certain embodiments, the plurality of indentations in an embossed layer may be arranged to form a pattern. In some embodiments, the pattern of indentations may be simple, such as a checkerboard pattern, or more complex like a honeycomb pattern. In other cases, for example, the pattern may be cubic, hexagonal, and/or polygonal. The pattern of indentations may be regular or irregular.

In embodiments in which a layer described herein includes a non-planar surface (e.g., an embossed surface), the average size or depth of the surface features (e.g., indentations) in the layer may be at least at least 0.05 times, at least 0.1 times, at least 0.2 times, at least 0.5 times, at least 1 time, at least 2 times, at least 4 times, at least 6 times, or at least 8 times the average thickness of the layer. The average size or depth of the surface features (e.g., indentations) in the layer may be less than or equal to 10 times, less than or equal to 8 times, less than or equal to 5 times, less than or equal to 3 times, less than or equal to 2 times, or less than or equal to 1 time the average thickness of the layer (e.g., an average size or depth of at least 0.1 times and less than or equal to 4 times the average thickness of the layer). Other ranges are also possible.

In embodiments in which a layer described herein includes a non-planar surface (e.g., an embossed surface), the average size or depth of the surface features (e.g., indentations) in the layer may be at least 0.05 times, at least 0.1 times, at least 0.2 times, at least 0.5 times, at least 1 time the overall thickness of the layer. The average size or depth of the surface features (e.g., indentations) in the layer may be less than or equal to 1 time, less than or equal to 0.5 times, less than or equal to 0.2 times, or less than or equal to 0.1 times the overall thickness of the layer (e.g., an average size or depth of at least 0.1 times and less than or equal to 1 times the overall thickness of the layer). Other ranges are also possible.

The frequency of indentations in a layer may also vary. In some embodiments, a layer described herein (e.g., an embossed layer) may have at least 1 indentation/100 mm$^2$, at least 2 indentations/100 mm$^2$, at least 5 indentations/100 mm$^2$, at least 10 indentations/100 mm$^2$, at least 20 indentations/10 mm$^2$, at least 30 indentations/100 mm$^2$, at least 40 indentations/100 mm$^2$, at least 50 indentations/100 mm$^2$, at least 60 indentations/100 mm$^2$, at least 70 indentations/100 mm$^2$, at least 80 indentations/100 mm$^2$, or at least 90 indentations/100 mm$^2$. In certain embodiments, a layer described herein (e.g., an embossed layer) may have less than or equal to 100 indentations/100 mm$^2$, less than or equal to 90 indentations/100 mm$^2$, less than or equal to 80 indentations/100 mm$^2$, less than or equal to 70 indentations/100 mm$^2$, less than or equal to 60 indentations/100 mm$^2$, less than or equal to 50 indentations/100 mm$^2$, less than or equal to 40 indentations/100 mm$^2$, less than or equal to 30 indentations/100 mm$^2$, less than or equal to 20 indentations/100 mm$^2$, less than or equal to 10 indentations/100 mm$^2$, less than or equal to 5 indentations/100 mm$^2$, or less than or equal to 2 indentations/100 mm$^2$ at least 10 indentations/100 mm$^2$ and less than or equal to 100 indentations/100 mm$^2$ The percent surface area of the layer that is embossed (i.e., the percent surface area that is indented) may also vary. In some embodiments, the percent surface area of the layer that is embossed may be greater than or equal to about 5%, greater than or equal to about 10%, greater than or equal to about 20%, greater than or equal to about 30%, greater than or equal to about 40%, greater than or equal to about 50%, greater than or equal to about 60%, greater than or equal to about 70%, greater than or equal to about 75%, greater than or equal to about 80%, or greater than or equal to about 90%. In some instances, the percent surface area of the layer that is embossed may be less than 100%, less than or equal to about 90%, less than or equal to about 80%, less than or equal to about 75%, less than or equal to about 70%, less than or equal to about 60%, less than or equal to about 50%, less than or equal to about 40%, less than or equal to about 30%, less than or equal to about 20%, or less than or equal to about 15%. Combination of the above-referenced ranges are also possible (e.g., greater than or equal to about 10% and less than or equal to about 30%). Other values are also possible. In some embodiments, both sides/surfaces of the layer may have percentages within one or more of the above-referenced ranges.

In some embodiments, creping may be used to shape the layer. In some embodiments, creping refers to the generation of a 3D structure of a flat wet sheet using a quick change of speed and angle of the sheet path from a smooth roll. In some embodiments, creping may be used to form an irregular shape in the layer, such as an irregular wave pattern. In some embodiments, creping may be used to form a regular shape. In some embodiments, creping may result in bends, curves, waves or patterns within the layer having an amplitude, frequency and/or percent surface area of coverage as described herein.

In some embodiments, micrexing may be used to shape the layer. Micrex is similar to creping but is performed on a fully dried sheet. In some embodiments, micrexing may be used to form an irregular shape in the layer, such as an irregular wave pattern. In some embodiments, microexing may be used to form a regular shape. In some embodiments, micrexing may result in bends, curves, waves or patterns within the layer having an amplitude, frequency and/or percent surface area of coverage as described herein.

It should be appreciated that while in some embodiments a layer may be shaped, e.g., corrugated, pleated, embossed, creped, and/or micrexed, in some embodiments, a layer described herein (e.g., a shaped layer, a non-woven layer) is not corrugated, not pleated, not embossed, not creped, and/or not micrexed. Additionally, it should be understood that in certain embodiments, more than one shaping technique can be used to form a layer and/or separator described herein (e.g., corrugation and embossing). Shaped layers that include additives are also possible. Other configurations are also possible.

In some embodiments, a non-woven web may include glass fibers (e.g., microglass fibers, chopped strand glass fibers, or a combination thereof). Microglass fibers and chopped strand glass fibers are known to those of ordinary skill in the art. One of ordinary skill in the art is able to determine whether a glass fiber is microglass or chopped strand by observation (e.g., optical microscopy, electron microscopy). Microglass fibers may also have chemical differences from chopped strand glass fibers. In some cases, though not required, chopped strand glass fibers may contain a greater content of calcium or sodium than microglass fibers. For example, chopped strand glass fibers may be close to alkali free with high calcium oxide and alumina content. Microglass fibers may contain 10-15% alkali (e.g., sodium, magnesium oxides) and have relatively lower melting and processing temperatures. The terms refer to the technique(s) used to manufacture the glass fibers. Such techniques impart the glass fibers with certain characteristics. In general, chopped strand glass fibers are drawn from bushing tips and cut into fibers in a process similar to textile production. Chopped strand glass fibers are produced in a more controlled manner than microglass fibers, and as a result, chopped strand glass fibers will generally have less variation in fiber diameter and length than microglass fibers. Microglass fibers are drawn from bushing tips and further subjected to flame blowing or rotary spinning processes. In some cases, fine microglass fibers may be made using a remelting process. In this respect, microglass fibers may be fine or coarse. As used herein, fine microglass fibers are less than or equal to 1 micron in diameter and coarse microglass fibers are greater than or equal to 1 micron in diameter.

The microglass fibers may have small diameters. For instance, in some embodiments, the average diameter of the microglass fibers may be less than or equal to about 10 microns, less than or equal to about 9 microns, less than or equal to about 7 microns, less than or equal to about 5 microns, less than or equal to about 3 microns, or less than or equal to about 1 micron. In some instances, the microglass fibers may have an average fiber diameter of greater than or equal to about 0.1 microns, greater than or equal to about 0.3 microns, greater than or equal to about 1 micron, greater than or equal to about 3 microns, or greater than or equal to about 7 microns. Combinations of the above-referenced ranges are also possible (e.g., greater than or equal to about 0.1 microns and less than or equal to about 10 microns, greater than or equal to about 0.1 microns and less than or equal to about 5 microns, greater than or equal to about 0.3 microns and less than or equal to about 3 microns). Other values of average fiber diameter are also possible. Average diameter distributions for microglass fibers are generally log-normal. However, it can be appreciated that microglass fibers may be provided in any other appropriate average diameter distribution (e.g., Gaussian distribution).

In some embodiments, the average length of microglass fibers may be less than or equal to about 10 mm, less than or equal to about 10 mm, less than or equal to about 8 mm, less than or equal to about 6 mm, less than or equal to about 5 mm, less than or equal to about 4 mm, less than or equal to about 3 mm, or less than or equal to about 2 mm. In certain embodiments, the average length of microglass fibers may be greater than or equal to about 1 mm, greater than or equal to about 2 mm, greater than or equal to about 4 mm, greater than or equal to about 5 mm, greater than equal to about 6 mm, or greater than or equal to about 8 mm. Combinations of the above referenced ranges are also possible (e.g., microglass fibers having an average length of greater than or equal to about 4 mm and less than about 6 mm). Other ranges are also possible.

In other embodiments, the microglass fibers may vary significantly in length as a result of process variations. For instance, in some embodiments, the average aspect ratios (length to diameter ratio) of the microglass fibers in a non-woven web may be greater than or equal to about 100, greater than or equal to about 200, greater than or equal to about 300, greater than or equal to about 1000, greater than or equal to about 3,000, greater than or equal to about 6,000, greater than or equal to about 9,000. In some instances, the microglass fibers may have an average aspect ratio of less than or equal to about 10,000, less than or equal to about 5,000, less than or equal to about 2,500, less than or equal to about 600, or less than or equal to about 300. Combinations of the above-referenced ranges are also possible (e.g., greater than or equal to about 200 and less than or equal to about 2,500). Other values of average aspect ratio are also possible. It should be appreciated that the above-noted dimensions are not limiting and that the microglass fibers may also have other dimensions.

In general, chopped strand glass fibers may have an average fiber diameter that is greater than the diameter of the microglass fibers. For instance, in some embodiments, the average diameter of the chopped strand glass fibers may be greater than or equal to about 5 microns, greater than or equal to about 7 microns, greater than or equal to about 9 microns, greater than or equal to about 11 microns, or greater than or equal to about 20 microns. In some instances, the chopped strand glass fibers may have an average fiber diameter of less than or equal to about 30 microns, less than or equal to about 25 microns, less than or equal to about 15 microns, less than or equal to about 12 microns, or less than or equal to about 10 microns. Combinations of the above-referenced ranges are also possible (e.g., greater than or equal to about 5 microns and less than or equal to about 12 microns). Other values of average fiber diameter are also possible. Chopped strand diameters tend to follow a normal distribution. Though, it can be appreciated that chopped strand glass fibers may be provided in any appropriate average diameter distribution (e.g., Gaussian distribution).

In some embodiments, chopped strand glass fibers may have a length in the range of between about 0.125 inches and about 1 inch (e.g., about 0.25 inches, or about 0.5 inches). In some embodiments, the average length of chopped strand glass fibers may be less than or equal to about 1 inch, less than or equal to about 0.8 inches, less than or equal to about 0.6 inches, less than or equal to about 0.5 inches, less than or equal to about 0.4 inches, less than or equal to about 0.3 inches, or less than or equal to about 0.2 inches. In certain embodiments, the average length of chopped strand glass fibers may be greater than or equal to about 0.125 inches, greater than or equal to about 0.2 inches, greater than or equal to about 0.4 inches, greater than or equal to about 0.5 inches, greater than equal to about 0.6 inches, or greater than or equal to about 0.8 inches. Combinations of the above referenced ranges are also possible (e.g., chopped strand glass fibers having an average length of greater than or equal to about 0.125 inches and less than about 1 inch). Other ranges are also possible.

It should be appreciated that the above-noted dimensions are not limiting and that the microglass and/or chopped strand fibers, as well as the other fibers described herein, may also have other dimensions.

In some embodiments, the average diameter of the glass fibers in the non-woven web may be greater than or equal to about 0.1 microns, greater than or equal to about 0.3 microns, greater than or equal to about 0.5 microns, greater than or equal to about 1 micron, greater than or equal to about 2 microns, greater than or equal to about 3 microns, greater than or equal to about 5 microns, greater than or equal to about 7 microns, greater than or equal to about 9 microns, greater than or equal to about 10 microns, or greater than or equal to about 12 microns. In some instances, the average diameter of the glass fibers in the non-woven web may have an average fiber diameter of less than or equal to about 15 microns, less than or equal to about 12 microns, less than or equal to about 10 microns, less than or equal to about 8 microns, less than or equal to about 5 microns, less than or equal to about 3 microns, or less than or equal to about 1 micron. Combinations of the above-referenced ranges are also possible (e.g., greater than or equal to about 0.1 microns and less than or equal to about 15 microns, greater than or equal to about 0.1 microns and less than or equal to about 10 microns, greater than or equal to about 0.1 microns and less than or equal to about 5 microns, greater than or equal to about 0.3 microns and less than or equal to about 3 microns).

In some embodiments, the average length of the glass fibers in the non-woven web may be less than or equal to about 50 mm, less than or equal to about 40 mm, less than or equal to about 30 mm, less than or equal to about 25 mm, less than or equal to about 20 mm, less than or equal to about 15 mm, less than or equal to about 12 mm, less than or equal to about 10 mm, less than or equal to about 8 mm, less than or equal to about 5 mm, less than or equal to about 3 mm, or less than or equal to about 1 mm. In certain embodiments, the average length diameter of the glass fibers in the non-woven web may be greater than or equal to about 0.05 mm, greater than or equal to about 0.1 mm, greater than or equal to about 0.2 mm, greater than or equal to about 0.5 mm, greater than equal to about 1 mm, greater than or equal to about 5 mm, greater than equal to about 10 mm, greater than or equal to about 15 mm, greater than equal to about 20 mm, greater than or equal to about 30 mm, or greater than or equal to about 40 mm. Combinations of the above referenced ranges are also possible (e.g., greater than or equal to about 0.05 mm and less than about 50 mm, greater than or equal to about 1 mm and less than about 25 mm, greater than or equal to about 0.1 mm and less than about 12 mm, greater than or equal to about 0.2 mm and less than about 6 mm, greater than or equal to about 0.5 mm and less than about 3 mm). Other ranges are also possible.

A non-woven web may include a suitable percentage of glass fibers. In some embodiments, the weight percentage of glass fibers in the non-woven web may be greater than or equal to about 2 wt. %, greater than or equal to about 5 wt. %, greater than or equal to about 10 wt. %, greater than or equal to about 20 wt. %, greater than or equal to about 30 wt. %, greater than or equal to about 40 wt. %, greater than or equal to about 50 wt. %, greater than or equal to about 60 wt. %, greater than or equal to about 70 wt. %, greater than or equal to about 80 wt. %, or greater than or equal to about 90 wt. %. In some embodiments, the weight percentage of the glass fibers in the non-woven web may be less than or equal to about 100 wt. %, less than or equal to about 98 wt. %, less than or equal to about 95 wt. %, less than or equal to about 90 wt. %, less than or equal to about 80 wt. %, less than or equal to about 70 wt. %, less than or equal to about 60 wt. %, less than or equal to about 50 wt. %, less than or equal to about 40 wt. %, less than or equal to about 30 wt. %, less than or equal to about 20 wt. %, less than or equal to about 10 wt. %, or less than or equal to about 5 wt. %. Combinations of the above-referenced ranges are also possible (e.g., greater than about 2 wt. % and less than or equal to about 100 wt. %, greater than about 2 wt. % and less than or equal to about 95 wt. %, greater than about 5 wt. % and less than or equal to about 50 wt. %, greater than about 10 wt. % and less than or equal to about 50 wt. %, greater than about 10 wt. % and less than or equal to about 30 wt. %). Other ranges are also possible. In some embodiments, a non-woven web includes the above-noted ranges of glass fibers with respect to the total weight of fibers in the non-woven web and/or the battery separator.

In some embodiments, a non-woven web described herein includes one or more synthetic fibers. Synthetic fibers may include any suitable type of synthetic polymer. Examples of suitable synthetic fibers include polyester, polyaramid, polyimide, polyolefin (e.g., polyethylene), polypropylene, Kevlar, nomex, halogenated polymers (e.g., polyethylene terephthalate), acrylics, polyphenylene oxide, polyphenylene sulfide, and combinations thereof. In some embodiments, the synthetic fibers are organic polymer fibers. Synthetic fibers may also include multi-component fibers (i.e., fibers having multiple compositions such as bi-component fibers). The non-woven web may also include combinations of more than one type of composition of synthetic fiber. It should be understood that other compositions of synthetic fiber types may also be used.

In some embodiments, synthetic fibers may be staple fibers, which may be synthetic fibers that are cut to a suitable average length and are appropriate for incorporation into a wet-laid or dry-laid process for forming a non-woven web. In some cases, groups of staple fibers may be cut to have a particular length with only slight variations in length between individual fibers.

In some embodiments, synthetic fibers may be binder fibers, as described in more detail below.

Non-woven webs including combinations of different types of synthetic fibers are also possible.

A non-woven web may include a suitable percentage of synthetic fibers. In some embodiments, the weight percentage of synthetic fibers in the non-woven web may be 0%, greater than or equal to about 1 wt. %, greater than or equal to about 5 wt. %, greater than or equal to about 10 wt. %, greater than or equal to about 15 wt. %, greater than or equal to about 20 wt. %, greater than or equal to about 30 wt. %, greater than or equal to about 40 wt. %, greater than or equal to about 50 wt. %, greater than or equal to about 60 wt. %, or greater than or equal to about 70 wt. %. In some embodiments, the weight percentage of the synthetic fibers in the non-woven web may be less than or equal to about 80 wt. %, less than or equal to about 70 wt. %, less than or equal to about 60 wt. %, less than or equal to about 50 wt. %, less than or equal to about 40 wt. %, less than or equal to about 30 wt. %, less than or equal to about 20 wt. %, less than or equal to about 10 wt. %, or less than or equal to about 5 wt. %. Combinations of the above-referenced ranges are also possible (e.g., greater than about 1 wt. % and less than or equal to about 80 wt. %, greater than about 1 wt. % and less than or equal to about 50 wt. %, greater than about 5 wt. % and less than or equal to about 50 wt. %, greater than about 5 wt. % and less than or equal to about 30 wt. %, greater than about 10 wt. % and less than or equal to about 40 wt. %, greater than about 15 wt. % and less than or equal to about 25 wt. %). Other ranges are also possible. In some embodiments, a non-woven web includes the above-noted ranges of synthetic fibers with respect to the total weight of fibers in the non-woven web and/or the battery separator.

In general, synthetic fibers may have any suitable dimensions. For instance, in some embodiments, the synthetic fibers may have an average diameter of greater than or equal to about 0.5 micron, greater than or equal to about 1 micron, greater than or equal to about 2 microns, greater than or equal to about 4 microns, greater than or equal to about 6 microns, greater than or equal to about 8 microns, greater than or equal to about 10 microns, greater than or equal to about 12 microns, greater than or equal to about 15 microns, greater than or equal to about 20 microns, greater than or equal to about 30 microns, or greater than or equal to about 40 microns. In some cases, the synthetic fibers may have an average diameter of less than or equal to about 50 microns, less than or equal to about 40 microns, less than or equal to about 30 microns, less than or equal to about 20 microns, less than or equal to about 15 microns, less than or equal to about 12 microns, less than or equal to about 10 microns, than or equal to about 8 microns, less than or equal to about 6 microns, less than equal to about 4 microns, or less than or equal to about 2 microns. Combinations of the above referenced ranges are also possible (e.g., greater than or equal to about 0.5 microns and less than about 50 microns, greater than or equal to about 5 microns and less than about 20 microns). Other ranges are also possible.

In some embodiments, synthetic fibers may have an average length of greater than or equal to about 0.25 mm, greater than or equal to about 0.5 mm, greater than or equal to about 1 mm, greater than or equal to about 3 mm, greater than or equal to about 5 mm, greater than or equal to about 10 mm, greater than or equal to about 25 mm, greater than or equal to about 50 mm, greater than or equal to about 75 mm, greater than or equal to about 100 mm, greater than or equal to about 150 mm, greater than or equal to about 200 mm, or greater than or equal to about 250 mm. In some instances, synthetic fibers may have an average length of less than or equal to about 300 mm, less than or equal to about 250 mm, less than or equal to about 200 mm, less than or equal to about 150 mm, less than or equal to about 100 mm, less than or equal to about 76 mm, less than or equal to about 50 mm, less than or equal to about 25 mm, less than or equal to about 20 mm, less than or equal to about 15 mm, less than or equal to about 12 mm, less than or equal to about 10 mm, less than or equal to about 9 mm, less than or equal to about 6 mm, less than or equal to about 4 mm, less than or equal to about 2 mm, or less than or equal to about 1 mm. Combinations of the above-referenced ranges are also possible (e.g., greater than or equal to about 0.5 mm and less than or equal to about 300 mm, greater than or equal to about 0.25 mm and less than or equal to about 76 mm, greater than or equal to about 1 mm and less than or equal to about 12 mm, greater than or equal to about 3 mm and less than or equal to about 9 mm). Other values of average fiber length are also possible.

As described herein, in some embodiments, at least a portion of the synthetic fibers may be binder fibers. The binder fibers may be mono-component (i.e., having a single composition) or multi-component (i.e., having multiple compositions such as a bi-component fiber). The non-woven web may include a suitable percentage of mono-component fibers and/or multi-component fibers. In some embodiments, all of the synthetic fibers are mono-component fibers. In some embodiments, at least a portion of the synthetic fibers are multi-component fibers. In some embodiments, the non-woven web may comprise a residue from a binder fiber.

An example of a multi-component fiber is a bi-component fiber which includes a first material and a second material that is different from the first material. The different components of a multi-component fiber may exhibit a variety of spatial arrangements. For example, multi-component fibers may be arranged in a core-sheath configuration (e.g., a first material may be a sheath material that surrounds a second material which is a core material), a side by side configuration (e.g., a first material may be arranged adjacent to a second material), a segmented pie arrangement (e.g., different materials may be arranged adjacent to one another in a wedged configuration), a tri-lobal arrangement (e.g., a tip of a lobe may have a material different from the lobe) and an arrangement of localized regions of one component in a different component (e.g., "islands in sea").

In some embodiments, for a core-sheath configuration, a multi-component fiber, such as a bi-component fiber, may include a sheath of a first material that surrounds a core comprising a second material. In such an arrangement, for some embodiments, the melting point of the first material may be lower than the melting point of the second material. Accordingly, at a suitable step during manufacture of a non-woven web (e.g., drying), the first material comprising the sheath may be melted (e.g., may exhibit a phase change) while the second material comprising the core remains unaltered (e.g., may exhibit no phase change). For instance, an outer sheath portion of a multi-component fiber may have a melting temperature between about 50° C. and about 200° C. (e.g., 180° C.) and an inner core of the multi-component fiber may have a melting temperature above 200° C. As a result, when the fiber is subjected to a temperature during drying, e.g., at 180° C., then the outer sheath of the fiber may melt while the core of the fiber does not melt.

Examples of suitable multi-component fibers include polyolefin (e.g., polyethylene/PET, coPET (e.g., melt amorphous, melt crystalline)/PET, and polyethylene/polypropylene. In this listing of multi-component fibers, the convention is to list the material having the lower melting temperature (e.g., first material) separated from the material having the higher melting temperature (e.g., second material) with a "/". Other suitable compositions are known to those of skill in the art. In some embodiments, the binder fiber may include a vinyl compounds (e.g., polyvinyl alcohol).

In some embodiments, the weight percentage of multi-component fibers (e.g., bi-component fibers) in the non-woven web may be 0%, greater than or equal to about 1 wt. %, greater than or equal to about 5 wt. %, greater than or equal to about 10 wt. %, greater than or equal to about 15 wt. %, greater than or equal to about 20 wt. %, greater than or equal to about 30 wt. %, greater than or equal to about 40 wt. %, greater than or equal to about 50 wt. %, greater than or equal to about 60 wt. %, or greater than or equal to about 70 wt. %. In some embodiments, the weight percentage of the multi-component fibers (e.g., bi-component fibers) in the non-woven web may be less than or equal to about 80 wt. %, less than or equal to about 70 wt. %, less than or equal to about 60 wt. %, less than or equal to about 50 wt. %, less than or equal to about 40 wt. %, less than or equal to about 30 wt. %, less than or equal to about 20 wt. %, less than or equal to about 10 wt. %, or less than or equal to about 5 wt. %. Combinations of the above-referenced ranges are also possible (e.g., greater than about 5 wt. % and less than or equal to about 30 wt. %). Other ranges are also possible. In some embodiments, a non-woven web includes the above-noted ranges of multi-component fibers (e.g., bi-component fibers) with respect to the total weight of fibers in the non-woven web and/or the battery separator.

In general, a non-woven web and/or separator may include any suitable binder resin. Features of the binder resin may include resistance to the battery environment (e.g., acid electrolyte, oxidation), the ability to be applied in the form of a water soluble emulsion or dispersion, even flow characteristics on the non-woven web upon drying, thermal stability, and/or the ability to thermally cure above 100° C. within 1 minute. The binder resin may comprise a thermoplastic, a thermoset, or a combination thereof. For example, the binder resin may include one or more of the following resins: natural rubber, acrylic, latex emulsion, styrene-acrylic, synthetic rubber (e.g., styrene butadiene rubber), styrene acrylonitrile, and combinations thereof. In some embodiments, the resin may be provided as an aqueous or solvent-based system. In some such embodiments, the binder resin may be an emulsion or dispersion. In certain embodiments, the binder resin may be provided as a non-aqueous solvent-based system. In some embodiments, one or more of the polymers in the resin may comprise aryl pendant groups. These aryl groups may impart stiffness and steric hindrance on to the main chain, providing excellent chemical and electrochemical resistance.

The amount of resin in a non-woven web may vary. For example, the weight percentage of binder resin in the non-woven web and/or battery separator may be between 0 wt. % and 40 wt. %. In some embodiments, the weight percentage of resin in the non-woven web may be greater than or equal to about 2 wt. %, greater than or equal to about 5 wt. %, greater than or equal to about 10 wt. %, greater than or equal to about 15 wt. %, greater than or equal to about 20 wt. %, greater than or equal to about 25 wt. %, greater than or equal to about 30 wt. %, greater than or equal to about 35 wt. %, greater than or equal to about 40 wt. %, or greater than or equal to about 45 wt. %. In some cases, the weight percentage of resin in the non-woven web may be less than or equal to about 50 wt. %, less than or equal to about 45 wt. %, less than or equal to about 40 wt. %, less than or equal to about 35 wt. %, less than or equal to about 30 wt. %, less than or equal to about 25 wt. %, less than or equal to about 20 wt. %, less than or equal to about 15 wt. %, less than or equal to about 10 wt. %, or less than or equal to about 5 wt. %. Combinations of the above-referenced ranges are also possible (e.g., greater than or equal to about 2 wt. % and less than about 40 wt. %, greater than or equal to about 5 wt. % and less than about 40 wt. %, greater than or equal to about 5 wt. % and less than about 20 wt. %, greater than or equal to about 10 wt. % and less than about 20 wt. %). Other ranges are also possible. The weight percentage of binder resin in the entire non-woven web and/or battery separator is based on the dry solids and can be determined prior to coating the non-woven web.

To form a binder resin containing one or more chemical additives and/or other components of the non-woven web (e.g., inorganic particles), the chemical additive(s) and/or other components to be included in the binder resin may first be added in a specific amount to a solution or suspension (e.g., water or other solvent). In some embodiments, an emulsion is formed. A binder resin (and any optional additives) may then be combined and mixed with the solution/suspension/emulsion containing the chemical additive(s) and/or other components. It should be understood that this method of binder resin formulation is not limiting and other methods of resin formulation are possible. A binder resin containing chemical additive(s) and/or other components therein may be added to the non-woven web in any suitable manner (e.g., in the wet state or in the dry state) after the non-woven web is formed and/or during formation of the non-woven web.

In some embodiments, the non-woven web may comprise inorganic particles. In some embodiments, inorganic particles in the non-woven web may result in one or more of the following advantages: reduce the pore size of the non-woven without significantly altering the volume porosity of the non-woven web, increase the wicking and wettability of the non-woven web, absorb more electrolyte compared to a similar non-woven web that lacks inorganic particles (all other factors being equal), e.g., due to the wetting properties of the inorganic particles, and/or scavenge harmful contaminants such as heavy metal ions. For instance, in some embodiments inorganic particles having very fine pores may create enhanced capillary forces to absorb electrolyte and the trapping of contaminants may be due, at least in part, to this capillary action. In some embodiments, the inorganic particles may coat the fibers of the non-woven and serve to reduce the pore size and/or the variation in pore size of the non-woven web.

Non-limiting examples of inorganic particles include silica (e.g., fumed, ground/mineral, fused, precipitated, agglomerated), clay, talc, diatoms (e.g., diatomaceous earth), zeolites, $TiO_2$, rice husk ash, other ashes, and combinations thereof. In some embodiments, the inorganic particles are substantially non-porous. For certain battery types, a suitable inorganic particle may be resistant to sulfuric acid and/or may have a suitable surface area.

In some embodiments, the weight percentage of inorganic particles in the non-woven web and/or battery separator may be greater than or equal to about 10 wt. %, greater than or equal to about 20 wt. %, greater than or equal to about 30 wt. %, greater than or equal to about 40 wt. %, greater than or equal to about 50 wt. %, greater than or equal to about 60 wt. %, or greater than or equal to about 70 wt. %. In some cases, the weight percentage of inorganic particle in the non-woven web and/or battery separator may be less than or equal to about 80 wt. %, less than or equal to about 70 wt. %, less than or equal to about 60 wt. %, less than or equal to about 50 wt. %, less than or equal to about 40 wt. %, less than or equal to about 30 wt. %, less than or equal to about 20 wt. %, or less than or equal to about 15 wt. %. Combinations of the above-referenced ranges are also possible (e.g., greater than or equal to about 10 wt. % and less than about 80 wt. %, greater than or equal to about 30 wt. % and less than about 60 wt. %). Other ranges are also possible. The weight percentage of inorganic particles in the entire non-woven web and/or battery separator is based on the dry solids and can be determined prior to forming the non-woven web.

In some embodiments, the inorganic particles (e.g., silica) may have a relatively high surface area and/or may be porous. In certain embodiments, inorganic particles with a high surface area may resist stratification, or layering of acid, during recharge as a function of gravity. In some embodiments, the inorganic particles may be chemically inert and stable in acid. The inorganic particles may also be thermally stable.

In some embodiments, the inorganic particles included in a nonwoven web and/or separator described herein may be chosen to have a particular range of average surface area. The average surface area of the inorganic particles may be, for example, greater than or equal to about 10 $m^2/g$, greater than or equal to about 50 $m^2/g$, greater than or equal to about 100 $m^2/g$, greater than or equal to about 200 $m^2/g$, greater than or equal to about 400 $m^2/g$, greater than or equal to about 600 $m^2/g$, greater than or equal to about 800 $m^2/g$, greater than or equal to about 1,000 $m^2/g$, greater than or equal to about 1,250 $m^2/g$, greater than or equal to about 1,500 $m^2/g$, or greater than or equal to about 1,750 $m^2/g$. In some embodiments, the average surface area of the inorganic particles may be less than or equal to about 2,000 $m^2/g$, less than or equal to about 1,750 $m^2/g$, less than or equal to about 1,500 $m^2/g$, less than or equal to about 1,250 $m^2/g$, less than or equal to about 1,000 $m^2/g$, less than or equal to about 900 $m^2/g$, less than or equal to about 800 $m^2/g$, less than or equal to about 600 $m^2/g$, less than or equal to about 400 $m^2/g$, less than or equal to about 200 $m^2/g$, less than or equal to about 100 m²/g, or less than or equal to about 50 m²/g. Combinations of the above-referenced ranges are also possible (e.g., greater than or equal to 10 m²/g and less than or equal to about 2,000 m²/g, greater than or equal to about 50 m²/g and less than or equal to about 1,000 m²/g, greater than or equal to about 100 m²/g and less than or equal to about 600 m²/g, greater than or equal to about 400 m²/g and less than or equal to about 600 m²/g). Other ranges are also possible. As determined herein, surface area is measured according to BCIS-03A, September-9 revision, Method 8 (e.g., using a 0.5 gram sample).

In some embodiments, the average particle size (e.g., average diameter, or average cross-sectional dimension) of the inorganic particles included in a non-woven web and/or separator described herein may be, for example, greater than about 1 micron, greater than or equal to about 3 microns, greater than or equal to about 5 microns, greater than or equal to about 10 microns, greater than or equal to about 20 microns, greater than or equal to about 30 microns, greater than or equal to about 40 microns, greater than or equal to about 50 microns, greater than or equal to about 60 microns, greater than or equal to about 70 microns, greater than or equal to about 80 microns, or greater than or equal to about 90 microns. The particles may have an average particle size of, for example, less than or equal to about 100 microns, less than or equal to about 90 microns, less than or equal to about 80 microns, less than or equal to about 70 microns, less than or equal to about 60 microns, less than or equal to about 50 microns, less than or equal to about 40 microns, less than or equal to about 30 microns, less than or equal to about 20 microns, less than or equal to about 10 microns, or less than or equal to about 5 microns. Combinations of the above-referenced ranges are also possible (e.g., greater than or equal to about 1 micron and less than or equal to about 100 microns, greater than or equal to about 3 micron and less than or equal to about 10 microns). Other ranges are also possible.

In some embodiments, the inorganic particles included in a nonwoven web and/or battery separator may be resistant to sulfuric acid. As used herein, particles that are resistant to sulfuric acid refer to inorganic particles that have an acid weight loss of less than 20% (e.g., less than 15%, less than 10%, less than 5%) of the total weight of the particles after a three-hour reflux in 1.260 SG sulfuric acid using the BCIS-03A March 2010 method 13. The weight of the inorganic particles is measured prior to and after such sulfuric acid exposure to determine percent of weight lost (e.g., % acid weight loss=[weight of particles before exposure−weight of particles after exposure]/weight of particles before exposure*100). In some embodiments, inorganic particles having a total weight loss of less than 20%, less than 15%, less than 10%, or less than 5% are used in a non-woven web and/or battery separator described herein.

In general, any suitable process may be used to add the inorganic particles to the non-woven web and/or battery separator. In some embodiments, the inorganic particles are added with the fibers in the fiber slurry during formation of the non-woven web. Alternatively, the inorganic particles may be added into the binder resin. In certain embodiments, inorganic particles may be added to both the fiber slurry and the binder resin.

In some embodiments, the non-woven web and/or battery separator may comprise ribs as shown in FIG. 4B. One of ordinary skill in the art would understand that ribs are additional material that is added to one or more surfaces of one or more layers of the battery separator (e.g., a surface of a non-woven web described herein), and that ribs are discrete from the layer(s) on which the ribs are added (e.g., a distinguishable interface exists between the rib material and the layer on which the rib material is added) as illustrated in FIG. 4B. For instance, the ribs are typically added in a secondary step after the layer (e.g., non-woven web) has been formed. In certain embodiments, one or more of the chemical additives described herein, may be added to the ribs in the wt. %'s described earlier.

In general, any suitable material that is resistant to the battery environment may be used to form the ribs. Non-limiting examples of rib material includes thermoplastics, such as plastisol (e.g., polyvinylchloride blended with a plasticizer, polyacrylates), polyolefins (e.g., polyethylene, polypropylene, polybutylene, copolyethylene-octene, polyethylenevinylacetate), polyester, polystyrene, acrylonitrile-butadiene-styrene (ABS), polyvinylchloride, polyimides, polyurethanes, and thermosets, such as polyurethanes, polyacrylates, polyepoxides, reactive plastisols, phenolic resin, polyimides, rubber (e.g., natural, synthetic), and combinations thereof.

In general, the ribs may have any suitable shape and be arranged in any suitable pattern as described in PCT/IB/064420 filed Sep. 11, 2014, entitled Battery Separator with Ribs and a Method of Casting the Ribs on the Separator, which is incorporated herein by reference in its entirety. For example, the ribs may be in the form of lines (e.g., continuous, discontinuous) or dots arranged in rows on top of one or more layers of the battery separator. In some embodiments, ribs may not be present on the battery separator.

In some embodiments, the battery separator including a non-woven web comprising one or more chemical additives and/or non-planar layer may have desirable structural properties.

In some embodiments, the basis weight of one or more layers of the battery separator (e.g., the non-woven web and/or the overall battery separator) may range from between about 25 g/m² and about 1,200 g/m². For instance, in some embodiments, the basis weight of one or more layers of the battery separator (e.g., the non-woven web and/or the overall battery separator) may be greater than or equal to about 25 g/m², greater than or equal to about 40 g/m², greater than or equal to about 60 g/m², greater than or equal to about 80 g/m², greater than or equal to about 100 g/m², greater than or equal to about 150 g/m², greater than or equal to about 200 g/m², greater than or equal to about 250 g/m², greater than or equal to about 300 g/m², or greater than or equal to about 350 g/m². In some cases, the basis weight of one or more layers of the battery separator (e.g., the non-woven web and/or the overall battery separator) may be less than or equal to about 400 g/m², less than or equal to about 350 g/m², less than or equal to about 300 g/m², less than or equal to about 250 g/m², less than or equal to about 200 g/m², less than or equal to about 150 g/m², less than or equal to about 100 g/m², less than or equal to about 75 g/m², or less than or equal to about 50 g/m². Combinations of the above-referenced ranges are also possible (e.g., greater than or equal to about 25 g/m² and less than or equal to about 400 g/m², greater than or equal to about 80 g/m² and less than or equal to about 300 g/m²). Other ranges are also possible. As determined herein, the basis weight of the non-woven web and/or battery separator is measured according to the BCIS-03A, September-9, Method 3.

In certain embodiments, the basis weight of one or more layers of the battery separator (e.g., the non-woven web and/or the overall battery separator) may be higher than the above-recited range. In some embodiments, a non-planar (e.g., shaped) non-woven web or battery separator may have a greater basis weight compared to a similar non-woven web in planar form (e.g., prior to shaping), as described herein. For instance, in some embodiments, the basis weight of the non-woven web and/or battery separator may be greater than or equal to about 500 g/m², greater than or equal to about 600 g/m², greater than or equal to about 800 g/m², or greater than or equal to about 1,000 g/m². In some cases, the basis weight of one or more layers of the battery separator (e.g., the non-woven web and/or the overall battery separator) may be less than or equal to about 1,200 g/m², less than or equal to about 1,000 g/m², less than or equal to about 800 g/m², less than or equal to about 600 g/m², or less than or equal to about 500 g/m². Combinations of the above-referenced ranges are also possible (e.g., greater than or equal to about 25 g/m² and less than or equal to about 1,200 g/m², greater than or equal to about 100 g/m² and less than or equal to about 375 g/m²). Other ranges are also possible. As determined herein, the basis weight of the non-woven web and/or battery separator is measured according to the BCIS-03A September-9 Method 3.

Thickness, as referred to herein, is determined according to BCIS 03-A September-9, Method 10 using 10 kPa pressure. The thickness of one or more layers of the battery separator (e.g., the non-woven web and/or the overall battery separator) may be between about 0.05 mm and about 3 mm. In some embodiments, the thickness of the non-woven web and/or battery separator may be greater than or equal to about 0.05 mm, greater than or equal to about 0.1 mm, greater than or equal to about 0.2 mm, greater than or equal to about 0.3 mm, greater than or equal to about 0.5 mm, greater than or equal to about 0.8 mm, greater than or equal to about 1 mm, greater than or equal to about 1.2 mm, greater than or equal to about 1.5 mm, greater than or equal to about 1.8 mm, greater than or equal to about 2 mm, or greater than or equal to about 2.5 mm. In certain embodiments, the thickness of one or more layers of the battery separator (e.g., the non-woven web and/or the overall battery separator) may be less than or equal to about 3 mm, less than or equal to about 2.8 mm, less than or equal to about 2.5 mm, less than or equal to about 2.0 mm, less than or equal to about 1.8 mm, less than or equal to about 1.5 mm, less than or equal to about 1.2 mm, less than or equal to about 1 mm, less than or equal to about 0.8 mm, less than or equal to about 0.6 mm, less than or equal to about 0.4 mm, or less than or equal to about 0.2 mm. Combinations of the above-referenced ranges are also possible (e.g., greater than about 0.05 mm and less than or equal to about 3 mm, greater than about 0.1 mm and less than or equal to about 1 mm). Other ranges are also possible.

The overall thickness of one or more layers of the battery separator (e.g., the non-woven web and/or the overall battery separator) described herein may vary, for example, between about 0.05 mm and about 30 mm. In some embodiments, the overall thickness of the non-woven web and/or battery separator may be greater than or equal to about 0.05 mm, greater than or equal to about 0.1 mm, greater than or equal to about 0.5 mm, greater than or equal to about 1 mm, greater than or equal to about 2 mm, greater than or equal to about 3 mm, greater than or equal to about 5 mm, greater than or equal to about 8 mm, greater than or equal to about 10 mm, greater than or equal to about 12 mm, greater than or equal to about 15 mm, greater than or equal to about 20 mm, or greater than or equal to about 25 mm. In certain embodiments, the overall thickness of one or more layers of the battery separator (e.g., the non-woven web and/or the overall battery separator) may be less than or equal to about 30 mm, less than or equal to about 28 mm, less than or equal to about 25 mm, less than or equal to about 20 mm, less than or equal to about 18 mm, less than or equal to about 15 mm, less than or equal to about 12 mm, less than or equal to about 10 mm, less than or equal to about 8 mm, less than or equal to about 6 mm, less than or equal to about 3 mm, less than or equal to about 2 mm, less than or equal to about 1 mm, or less than or equal to about 0.5 mm. Combinations of the above-referenced ranges are also possible (e.g., greater than about 0.05 mm and less than or equal to about 30 mm, greater than about 0.5 mm and less than or equal to about 3 mm). Overall thickness, as referred to herein, is determined according to BCIS 03-A September-9, Method 10 using 10 kPa pressure.

In some embodiments, a non-woven web and/or battery separator described herein may have an apparent density of, for example, between about 40 g/m²/mm and about 300 g/m²/mm. For instance, in some embodiments, the apparent density of one or more layers of the battery separator (e.g., the non-woven web and/or the overall battery separator) may be less than or equal to about less than or equal to about 300 g/m²/mm, less than or equal to about less than or equal to about 275 g/m²/mm, less than or equal to about 250 g/m²/mm, less than or equal to about less than or equal to about 225 g/m²/mm, less than or equal to about 200 g/m²/mm, less than or equal to about 175 g/m²/mm, less than or equal to about 150 g/m²/mm, less than or equal to about 125 g/m²/mm, less than or equal to about 100 g/m²/mm, less than or equal to about 75 g/m²/mm, or less than or equal to about 50 g/m²/mm. In some cases, the apparent density of one or more layers of the battery separator (e.g., the non-woven web and/or the overall battery separator) may be greater than or equal to about 40 g/m²/mm, greater than or equal to about 60 g/m²/mm, greater than or equal to about 80 g/m²/mm, greater than or equal to about 100 g/m²/mm, greater than or equal to about 150 g/m²/mm, greater than or equal to about 200 g/m²/mm, greater than or equal to about 250 g/m²/mm, greater than or equal to about 300 g/m²/mm, or greater than or equal to about 350 g/m²/mm. Combinations of the above-referenced ranges are also possible (e.g., greater than or equal to about 40 g/m²/mm and less than or equal to about 300 g/m²/mm greater than or equal to about 80 g/m²/mm and less than or equal to about 150 g/m²/mm). Other ranges are also possible. As determined herein, the apparent density of one or more layers of the battery separator (e.g., the non-woven web and/or the overall battery separator) is measured by dividing the basis weight determined according to BCIS-03A September-9, Method 3 of the non-woven web (and/or battery separator) by the overall thickness of the non-woven web (and/or battery separator) determined according to BCIS 03-A September-9, Method 10 under 10 kPa.

In some embodiments, one or more layers of the battery separator (e.g., the non-woven web and/or the overall battery separator) described herein may have an internal volume porosity of greater than or equal to about 80%, greater than or equal to about 82%, greater than or equal to about 84%, greater than or equal to about 86%, greater than or equal to about 88%, greater than or equal to about 90%, greater than or equal to about 92%, greater than or equal to about 94%, or greater than or equal to about 96%. In some cases, one or more layers of the battery separator (e.g., the non-woven web and/or the overall battery separator) may have an internal volume porosity of less than or equal to about 99%, less than or equal to about 98%, less than or equal to about 96%, less than or equal to about 94%, less than or equal to about 92%, less than or equal to about 90%, less than or equal to about 88%, less than or equal to about 86%, less than or equal to about 84%, or less than or equal to about 82%. Combinations of the above-referenced ranges are also possible (e.g., greater than or equal to about 80% and less than about 98%, greater than or equal to about 90% and less than about 96%). Other ranges are also possible.

In some embodiments, one or more layers of the battery separator (e.g., the non-woven web and/or the overall battery separator) described herein may have a total volume porosity of greater than or equal to about 80%, greater than or equal to about 82%, greater than or equal to about 84%, greater than or equal to about 86%, greater than or equal to about 88%, greater than or equal to about 90%, greater than or equal to about 92%, greater than or equal to about 94%, or greater than or equal to about 96%. In some cases, the total volume porosity may have a volume porosity of less than or equal to about 99%, less than or equal to about 98%, less than or equal to about 96%, less than or equal to about 94%, less than or equal to about 92%, less than or equal to about 90%, less than or equal to about 88%, less than or equal to about 86%, less than or equal to about 84%, or less than or equal to about 82%. Combinations of the above-referenced ranges are also possible (e.g., greater than or equal to about 80% and less than about 98%, greater than or equal to about 80% and less than about 98%). Other ranges are also possible.

One or more layers of the battery separator (e.g., the non-woven web and/or the overall battery separator) may exhibit a suitable mean flow pore size for ionic conduction. In some embodiments, the mean flow pore size of the non-woven web and/or battery separator may be less than or equal to about 60 microns, less than or equal to about 50 microns, less than or equal to about 45 microns, less than or equal to about 40 microns, less than or equal to about 30 microns, less than or equal to about 25 microns, less than or equal to about 20 microns, less than or equal to about 15 microns, less than or equal to about 10 microns, or less than or equal to about 5 microns, less than or equal to about 3 microns, less than or equal to about 2 microns, less than or equal to about 1 micron, less than or equal to about 0.8 microns, less than or equal to about 0.5 microns, or less than or equal to about 0.2 microns. In other embodiments, the mean flow pore size may be greater than or equal to about 0.1 microns, greater than or equal to about 0.2 microns, greater than or equal to about 0.5 microns, greater than or equal to about 0.8 microns, greater than or equal to about 1 micron, greater than or equal to about 2 microns, greater than or equal to about 5 microns, greater than or equal to about 10 microns, greater than or equal to about 15 microns, greater than or equal to about 20 microns, greater than or equal to about 25 microns, greater than or equal to about 30 microns, greater than or equal to about 35 microns, greater than or equal to about 50 microns or greater than or equal to about 60 microns. Combinations of the above-referenced ranges are also possible (e.g., greater than or equal to about 0.1 microns and less than or equal to about 60 microns, greater than or equal to about 0.2 microns and less than or equal to about 30 microns). Other values and ranges of mean flow pore size are also possible. Mean flow pore size, as determined herein, is measured according to the standard BCIS-03A, September-9, Method 6.

In some embodiments, a non-woven web and/or battery separator described herein may have desirable mechanical strength characteristics. For example, the non-woven web and/or battery separator may be sufficiently strong to be used as a leaf and/or an envelope separator. In some embodiments, one or more layers of the battery separator (e.g., the non-woven web and/or the overall battery separator) may have a tensile strength in the machine direction of greater than or equal to about 10 kg/cm$^2$, greater than or equal to about 15 kg/cm$^2$, greater than or equal to about 20 kg/cm$^2$, greater than or equal to about 30 kg/cm$^2$, greater than or equal to about 40 kg/cm$^2$, greater than or equal to about 50 kg/cm$^2$, greater than or equal to about 60 kg/cm$^2$, greater than or equal to about 70 kg/cm$^2$, or greater than or equal to about 75 kg/cm$^2$. In some instances, the tensile strength in the machine direction may be less than or equal to about 80 kg/cm$^2$, less than or equal to about 70 kg/cm$^2$, less than or equal to about 60 kg/cm$^2$, less than or equal to about 50 kg/cm$^2$, less than or equal to about 40 kg/cm$^2$, less than or equal to about 30 kg/cm$^2$, less than or equal to about 20 kg/cm$^2$, or less than or equal to about 15 kg/cm$^2$. Combinations of the above-referenced ranges are also possible (e.g., greater than or equal to about 10 kg/cm$^2$ and less than or equal to about 80 kg/cm$^2$, greater than or equal to about 15 kg/cm$^2$ and less than or equal to about 60 kg/cm$^2$). The tensile strength in the machine direction may be determined using the standard BCIS 03B Rev March 2010 Method 4.

In some embodiments, the puncture strength (or puncture resistance) of a battery separator and/or a non-woven web described herein may be greater than or equal to about 1 N, greater than or equal to about 1.5 N, greater than or equal to about 2 N, greater than or equal to about 3 N, greater than or equal to about 5 N, greater than or equal to about 8 N, greater than or equal to about 10 N, greater than or equal to about 12N, or greater than or equal to about 15 N. In some instances, the puncture strength (or puncture resistance) may be less than or equal to about 20 N, less than or equal to about 18 N, less than or equal to about 15 N, less than or equal to about 12 N, less than or equal to about 10 N, less than or equal to about 8 N, less than or equal to about 5 N, or less than or equal to about 3 N. Combinations of the above-referenced ranges are also possible (e.g., greater than or equal to about 1 N and less than or equal to about 20 N, greater than or equal to about 1.5 N and less than or equal to about 15 N). The puncture strength may be determined using protocol BCIS 03B Rev March 2010 Method 9. The puncture resistance may be determined using BCIS 03B Rev March 2010 Method 10. In some embodiments, the puncture strength (or puncture resistance) of one or more layers of the battery separator (e.g., the non-woven web and/or the overall battery separator) described herein In some embodiments, the Gurley stiffness of one or more layers of the battery separator (e.g., the non-woven web and/or the overall battery separator) described herein, or an additional layer described herein, may be greater than or equal to about 500 mg, greater than or equal to about 800 mg, greater than or equal to about 1,000 mg, greater than or equal to about 1,250 mg, greater than or equal to about 1,500 mg, greater than or equal to about 1,750 mg, greater than or equal to about 2,000 mg, greater than or equal to about 2,500 mg, greater than or equal to about 3,000 mg, greater than or equal to about 3,500 mg, or greater than or equal to about 4,000 mg. In some instances, the Gurley stiffness may be less than or equal to about 5,000 mg, less than or equal to about 4,500 mg, less than or equal to about 4,000 mg, less than or equal to about 3,500 mg, less than or equal to about 3,000 mg, less than or equal to about 2,500 mg, less than or equal to about 2,000 mg, less than or equal to about 1,800 mg, less than or equal to about 1,500 mg, less than or equal to about 1,200 mg, or less than or equal to about 1,000 mg. Combinations of the above-referenced ranges are also possible (e.g., greater than or equal to about 500 mg and less than or equal to about 5000 mg, greater than or equal to about 800 to less than or equal to about 1200 mg). The Gurley stiffness may be determined using TAPPI T543 om-94 in the machine direction.

In some embodiments, a battery separator including a non-woven web including one or more chemical additives, one or more non-planar layers, and/or a suitable pore structure may have enhanced battery performance.

In some embodiments, a battery comprising a battery separator and/or one or more layers of the battery separator (e.g., the non-woven web) described herein may have a relatively low electrical resistance. For instance, in some embodiments, the electrical resistance may be less than or equal to about 1 $\Omega \cdot cm^2$, less than or equal to about 0.8 $\Omega \cdot cm^2$, less than or equal to about 0.6 $\Omega \cdot cm^2$, less than or equal to about 0.4 $\Omega \cdot cm^2$, less than or equal to about 0.2 $\Omega \cdot cm^2$, less than or equal to about 0.1 $\Omega \cdot cm^2$, less than or equal to about 0.08 $\Omega \cdot cm^2$, less than or equal to about 0.06 $\Omega \cdot cm^2$, less than or equal to about 0.04 $\Omega \cdot cm^2$, less than or equal to about 0.02 $\Omega \cdot cm^2$, less than or equal to about 0.01 $\Omega \cdot cm^2$, less than or equal to about 0.008 $\Omega \cdot cm^2$, or less than or equal to about 0.005 $\Omega \cdot cm^2$. In certain embodiments, the electrical resistance may be greater than or equal to about 0.001 $\Omega \cdot cm^2$, greater than or equal to about 0.003 $\Omega \cdot cm^2$, greater than or equal to about 0.005 $\Omega \cdot cm^2$, greater than or equal to about 0.008 $\Omega \cdot cm^2$, greater than or equal to about 0.01 $\Omega \cdot cm^2$, greater than or equal to about 0.05 $\Omega \cdot cm^2$, greater than or equal to about 0.08 $\Omega \cdot cm^2$, greater than or equal to about 0.1 $\Omega \cdot cm^2$, greater than or equal to about 0.3 $\Omega \cdot cm^2$, greater than or equal to about 0.5 $\Omega \cdot cm^2$, or greater than or equal to about 0.8 $\Omega \cdot cm^2$. Combinations of the above-referenced ranges are also possible (e.g., greater than about 0.001 $\Omega \cdot cm^2$ and less than or equal to about 1 $\Omega \cdot cm^2$, greater than about 0.01 $\Omega \cdot cm^2$ and less than or equal to about 0.5 $\Omega \cdot cm^2$). Other ranges are also possible. The electrical resistance may be measured according to the standard IS 6071-1986 or standard BCIS-03B method 3.

In some embodiments, the electrical resistance per thickness of the battery separator may be less than or equal to about 0.15 $(\Omega \cdot cm^2)/mm$, less than or equal to about 0.12 $(\Omega \cdot cm^2)/mm$, less than or equal to about 0.1 $(\Omega \cdot cm^2)/mm$, less than or equal to about 0.09 $(\Omega \cdot cm^2)/mm$, less than or equal to about 0.08 $(\Omega \cdot cm^2)/mm$, less than or equal to about 0.07 $(\Omega \cdot cm^2)/mm$, less than or equal to about 0.06 $(\Omega \cdot cm^2)/mm$, less than or equal to about 0.05 $(\Omega \cdot cm^2)/mm$, less than or equal to about 0.04 $(\Omega \cdot cm^2)/mm$, or less than or equal to about 0.03 $(\Omega \cdot cm^2)/mm$. In certain embodiments, the electrical resistance may be greater than or equal to about 0.02 $(\Omega \cdot cm^2)/mm$, greater than or equal to about 0.03 $(\Omega \cdot cm^2)/mm$, greater than or equal to about 0.04 $(\Omega \cdot cm^2)/mm$, greater than or equal to about 0.05 $(\Omega \cdot cm^2)/mm$, greater than or equal to about 0.06 $(\Omega \cdot cm^2)/mm$, greater than or equal to about 0.07 $(\Omega \cdot cm^2)/mm$, greater than or equal to about 0.08 $(\Omega \cdot cm^2)/mm$, greater than or equal to about 0.09 $(\Omega \cdot cm^2)/mm$, greater than or equal to about 0.1 $(\Omega \cdot cm^2)/mm$, or greater than or equal to about 0.12 $(\Omega \cdot cm^2)/mm$. Combinations of the above-referenced ranges are also possible (e.g., greater than about 0.02 $(\Omega \cdot cm^2)/mm$ and less than or equal to about 0.07 $(\Omega \cdot cm^2)/mm$, greater than about 0.02 $(\Omega \cdot cm^2)/mm$ and less than or equal to about 0.04 $(\Omega \cdot cm^2)/mm$). Other ranges are also possible. The electrical resistance may be measured according to the standard IS 6071-1986 or standard BCIS-03B method 3.

In some embodiments, one or more layers of the battery separator (e.g., the non-woven web and/or the overall battery separator) described herein may have a relatively long life time (e.g., a long time to failure). In some embodiments, the time to failure of the battery separator may be greater than or equal to about 5 hours, greater than or equal to about 10 hours, greater than or equal to about 25 hours, greater than or equal to about 50 hours, greater than or equal to about 100 hours, greater than or equal to about 250 hours, greater than or equal to about 500 hours, greater than or equal to about 750 hours, greater than or equal to about 1,000 hours, greater than or equal to about 1,250 hours, greater than or equal to about 1,500 hours, or greater than or equal to about 1,750 hours. In certain embodiments, the time to failure of the battery separator may be less than or equal to about 2,000 hours, less than or equal to about 1,750 hours, less than or equal to about 1,500 hours, less than or equal to about 1,250 hours, less than or equal to about 1,000 hours, less than or equal to about 750 hours, less than or equal to about 500 hours, less than or equal to about 250 hours, less than or equal to about 100 hours, or less than or equal to about 50 hours. Combinations of the above-referenced ranges are also possible (e.g., greater than about 5 hours and less than or equal to about 2,000 hours, greater than about 100 hours and less than or equal to about 1,000 hours). Other values are also possible. The time to failure of the battery separator may be measured according to the standard IS 6071-1986. Failure is defined as the time at which the measured voltage across the battery separator reaches 0V.

In some embodiments, loss of capacity of a battery including a battery separator and/or one or more layers of the battery separator (e.g., the non-woven web) described herein, after 18 weeks of cyclic testing (1530 cycles) with a 17% depth of discharge partial state of charge (i.e., PSOC), may be less than 30% of 20 hour capacity, less than 25% of 20 hour capacity, less than 20% of 20 hour capacity, less than 18% of 20 hour capacity, less than 15% of 20 hour capacity, less than 12% of 20 hour capacity, or less than 10% of 20 hour capacity. The 17% depth of discharge PSOC may be measured according to the VRLA SLI Batteries (AGM) Requirements and test, VDA Requirement Specification AGM: 2010-03 Method 9.9.3, e.g., using a European H8 size battery, 100 AH capacity.

In some embodiments, a battery described herein at 50% state of charge and 0° C., and including a battery separator and/or one or more layers of the battery separator (e.g., the non-woven web) described herein, may accept (i.e., have a charge acceptance of) greater than or equal to about 5 A per 100 AH of capacity, greater than or equal to about 10 A per 100 AH of capacity, greater than or equal to about 15 A per 100 AH of capacity, greater than or equal to about 20 A per 100 AH of capacity, greater than or equal to about 25 A per 100 AH of capacity, greater than or equal to about 35 A per 100 AH of capacity, greater than or equal to about 40 A per 100 AH of capacity, or greater than or equal to about 45 A per 100 AH of capacity, e.g., after 10 minutes of charging at 14.4 V. In some instances, the charge acceptance may be less than or equal to about 50 A per 100 AH of capacity, less than or equal to about 45 A/per 100 AH of capacity, less than or equal to about 40 A per 100 AH of capacity, less than or equal to about 35 A per 100 AH of capacity, less than or equal to about 30 A per 100 AH of capacity, less than or equal to about 25 A per 100 AH of capacity, less than or equal to about 20 A per 100 AH of capacity, or less than or equal to about 15 A per 100 AH of capacity. Combinations of the above-referenced ranges are also possible. The charge acceptance (i.e., effective amount of charge being accepted by the battery during charging) may be measured according to the VRLA SLI Batteries (AGM) Requirements and test, VDA Requirement Specification AGM: 2010-03 Method 9.5, e.g., using a European H8 size battery, 100 AH capacity.

In some embodiments, the dynamic charge acceptance (i.e., the charge acceptance at different states of charge) of a battery including a battery separator described herein may be 1 A/AH of total battery capacity (20 hr) at greater than or equal to about 10% state of charge, at greater than or equal to about 15% state of charge, at greater than or equal to about 20% state of charge, at greater than or equal to about 25% state of charge, at greater than or equal to about 30% state of charge, at greater than or equal to about 35% state of charge, at greater than or equal to about 40% state of charge, at greater than or equal to about 50% state of charge, at greater than or equal to about 60% state of charge, or at greater than or equal to about at 75% state of charge. In some instances, the dynamic charge acceptance may be 1 A/AH of total battery capacity (20 hr) at less than or equal to about at 80% state of charge, at less than or equal to about 70% state of charge, at less than or equal to about 60% state of charge, at less than or equal to about 50% state of charge, at less than or equal to about 45% state of charge, at less than or equal to about 40% state of charge, at less than or equal to about 35% state of charge, at less than or equal to about 30% state of charge, at less than or equal to about 25% state of charge, at less than or equal to about 20% state of charge, or at less than or equal to about 15% state of charge. Combinations of the above-referenced ranges are also possible. The dynamic charge acceptance may be measured according to VRLA SLI Batteries (AGM) Requirements and test, VDA Requirement Specification AGM: 2010-03 Method 9.6.

It should be appreciated that although some of the parameters and characteristics noted above are described with respect to non-woven webs, the same parameters and characteristics (including the values and ranges for such parameters and characteristics) may also be applied to a battery separator including the non-woven web.

In some embodiments, a separator described herein may be used in a battery (e.g., lead acid battery). The battery may comprise a negative plate, a positive plate, and a battery separator (e.g., including a non-woven web described herein) disposed between the negative and positive plates.

It is to be understood that the other components of the battery that are not explicitly discussed herein can be conventional battery components. Positive plates and negative plates can be formed of conventional lead acid battery plate materials. For example, in container formatted batteries, plates can include grids that include a conductive material, which can include, but is not limited to, lead, lead alloys, graphite, carbon, carbon foam, titanium, ceramics (such as Ebonex®), laminates and composite materials. The grids are typically pasted with active materials. The pasted grids are typically converted to positive and negative battery plates by a process called "formation." Formation involves passing an electric current through an assembly of alternating positive and negative plates with separators between adjacent plates while the assembly is in a suitable electrolyte (e.g., to convert pasted oxide to active materials).

As a specific example, positive plates may contain lead dioxide as the active material, and negative plates may contain lead as the active material. Plates can also contain one or more reinforcing materials, such as chopped organic fibers (e.g., having an average length of 0.125 inch or more), chopped glass fibers, metal sulfate(s) (e.g., nickel sulfate, copper sulfate), red lead (e.g., a $Pb_3O_4$-containing material), litharge, paraffin oil, and/or expander(s). In some embodiments, an expander contains barium sulfate, carbon black and lignin sulfonate as the primary components. The components of the expander(s) can be pre-mixed or not pre-mixed. Expanders are commercially available from, for example, Hammond Lead Products (Hammond, Ind.) and Atomized Products Group, Inc. (Garland, Tex.).

An example of a commercially available expander is the Texex® expander (Atomized Products Group, Inc.). In certain embodiments, the expander(s), metal sulfate(s) and/or paraffin are present in positive plates, but not negative plates. In some embodiments, positive plates and/or negative plates contain fibrous material or other glass compositions.

Figure 5A:
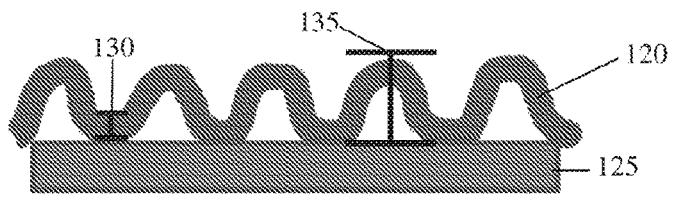
FIGS. 5A-5D are schematics of a battery separator and an electrode, according to one set of embodiments.
Figure 5B:
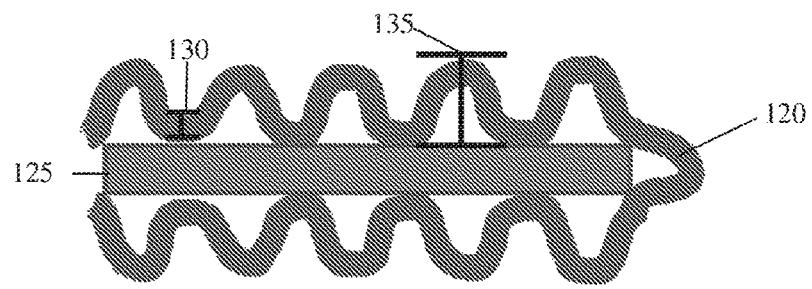
Figure 5C:
Figure 5D:
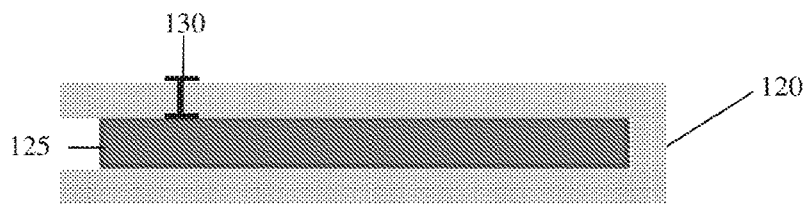

A battery can be assembled using any desired technique. For example, separators may be wrapped around plates (e.g., positive electrode, negative electrode). The positive plates, negative plates and separators are then assembled in a case using conventional lead acid battery assembly methods. The battery separators may be used, for example, as a leaf separator, as shown illustratively in FIGS. 5A and 5C, or an envelope separator (i.e., the separator is sealed on three sides) as shown illustratively in FIGS. 5B and 5D. FIG. 5 is a schematic diagram showing a cross-section of a battery separator 120 and a plate 125. The thickness 130 and overall thickness 135 of each separator as the terms are used herein are also shown in FIGS. 5A-5D. In certain embodiments, separators are compressed after they are assembled in the case, i.e., the thickness of the separators are reduced after they are placed into the case. An electrolyte (e.g., sulfuric acid) is then disposed in the case. It should be understood that the shapes (e.g., planar, non-planar) of the battery separators shown in FIG. 5 are non-limiting and the battery separators described herein may have any suitable shape. That is, the battery separators may be planar as shown in FIGS. 5C-5D or non-planar as shown in FIGS. 5A-5B, and non-planar battery separators may have the same or a different shape as separator 120 shown illustratively in FIGS. 5A-D. In some embodiments, a combination of planar and non-planar layers may be used in separator.

The electrolyte can include other compositions. For example, the electrolyte can include liquids other than sulfuric acid, such as a hydroxide (e.g., potassium hydroxide). In some embodiments, the electrolyte includes one or more additives, including but not limited to a mixture of an iron chelate and a magnesium salt or chelate, organic polymers and lignin and/or organic molecules, and phosphoric acid. In some embodiments, the electrolyte is sulfuric acid. In some embodiments, the specific gravity of the sulfuric acid is between 1.21 $g/cm^3$ and 1.32 $g/cm^3$, or between 1.28 $g/cm^3$ and 1.31 $g/cm^3$. In certain embodiments the specific gravity of the sulfuric acid is 1.26 $g/cm^3$. In certain embodiments the specific gravity of the sulfuric acid is about 1.3 $g/cm^3$.

In some embodiments, the battery separators (including the non-woven webs described herein) may be used in lead acid batteries including valve-regulated batteries (e.g., absorbent glass mat batteries) and flooded batteries. For example, in some embodiments, the battery separators may be used in flooded battery applications. In some such embodiments, the battery separator may be a enveloped separator that is wrapped around one or more plate (e.g., positive plate(s), positive and negative plate(s)). In some such embodiments, the battery separator may comprise a non-woven web bonded to a web/layer including glass fibers and resin. In some such cases, the battery separator may be wrapped around the plate, such that the glass layer faces and/or is in contact with the plate. In other cases, the battery separator may be wrapped around the plate, such that the glass layer is on a side opposite the plate. The glass layer may serve to stabilize the active material in the electrode(s) and minimize shedding. In certain embodiments, the battery separator does not include a web including glass fibers and resin. In some such embodiments, the glass fibers in a non-woven web described herein may serve to stabilize the active material in the electrode(s) and minimize shedding. In some embodiments in which a battery separator described herein is used in a flooded battery, the plates may include a glass layer embedded on to the plate that serves to decrease shedding of the plate and/or may comprise carbon based additives that increase the conductance of the plate (e.g., graphene, graphite) and/or have a high surface area (e.g., greater than or equal to about 500 $m^2/g$ and less than or equal to about 5,000 $m^2/g$). A enveloped battery separator, as described herein, may be wrapped around such a plate. In some embodiments, a carbon-impregnated non-woven web may be positioned adjacent to the plate. In some embodiments, a battery separator may be used in a flooded battery comprising various additives in the electrolyte solution.

As described herein, a non-woven web may form all or part of a battery separator. In some embodiments, one or more additional layers or components are included with the non-woven web (e.g., disposed adjacent to the non-woven web, contacting one or both sides of the non-woven web). In some instances, an additional layer is a fibrous layer. Non-limiting examples of fibrous additional layers include a meltblown layer, a wet laid layer (e.g., a glass fiber wet laid layer), a spunbond layer, an extruded layer, or an electrospun layer. In some embodiments, multiple non-woven webs in accordance with embodiments may be layered together in forming a multi-layer sheet for use in a battery separator. In other embodiments, an additional layer may be a non-fibrous layer. For example, the layer may be a polymeric layer formed by an extrusion process (e.g., a membrane such as a PE membrane). Other configurations are also possible.

In some embodiments two or more layers of a web may be formed separately, and combined by any suitable method such as lamination, collation, or by use of adhesives. The two or more layers may be formed using different processes, or the same process. For example, each of the layers may be independently formed by a wet laid process, a non-wet laid process, or any other suitable process.

In some embodiments, two or more layers may be formed by the same process. In some instances, the two or more layers may be formed simultaneously.

Different layers may be adhered together by any suitable method. For instance, layers may be adhered by an adhesive and/or melt-bonded to one another on either side. Lamination and calendering processes may also be used. In some embodiments, an additional layer may be formed from any type of fiber or blend of fibers via an added headbox or a coater and appropriately adhered to another layer.

A battery separator may include any suitable number of layers, e.g., at least 2, at least 3, at least 4, at least 5, at least 6, at least 7 layers. In some embodiments, a battery separator may include up to 10 layers.

Non-woven webs described herein may be produced using suitable processes, such as a wet laid process. In general, a wet laid process involves mixing together fibers of one or more type; for example, glass fibers of one type may be mixed together with glass fibers of another type, and/or with fibers of a different type (e.g., synthetic fibers), to provide a fiber slurry. The slurry may be, for example, an aqueous-based slurry. In certain embodiments, fibers are optionally stored separately, or in combination, in various holding tanks prior to being mixed together.

For instance, a first fiber may be mixed and pulped together in one container and a second fiber may be mixed and pulped in a separate container. The first fibers and the second fibers may subsequently be combined together into a single fibrous mixture. Appropriate fibers may be processed through a pulper before and/or after being mixed together. In some embodiments, combinations of fibers are processed through a pulper and/or a holding tank prior to being mixed together. It can be appreciated that other components (e.g., inorganic particles) may also be introduced into the mixture. Furthermore, it should be appreciated that other combinations of fibers types may be used in fiber mixtures, such as the fiber types described herein.

In certain embodiments, two or more layers are formed by a wet laid process. For example, a first dispersion (e.g., a pulp) containing fibers in a solvent (e.g., an aqueous solvent such as water) can be applied onto a wire conveyor in a papermaking machine (e.g., a fourdrinier or, a round former, or a rotoformer) to form first layer supported by the wire conveyor. A second dispersion (e.g., another pulp) containing fibers in a solvent (e.g., an aqueous solvent such as water) is applied onto the first layer either at the same time or subsequent to deposition of the first layer on the wire. Vacuum is continuously applied to the first and second dispersions of fibers during the above process to remove the solvent from the fibers, thereby resulting in an article containing first and second layers. The article thus formed is then dried and, if necessary, further processed by using known methods to form multi-layered non-woven webs.

Any suitable method for creating a fiber slurry may be used. In some embodiments, further additives are added to the slurry to facilitate processing. The temperature may also be adjusted to a suitable range, for example, between 33° F. and 100° F. (e.g., between 50° F. and 85° F.). In some cases, the temperature of the slurry is maintained. In some instances, the temperature is not actively adjusted.

In some embodiments, the wet laid process uses similar equipment as in a conventional papermaking process, for example, a hydropulper, a former or a headbox, a dryer, and an optional converter. A non-woven web can also be made with a laboratory handsheet mold in some instances. As discussed above, the slurry may be prepared in one or more pulpers. After appropriately mixing the slurry in a pulper, the slurry may be pumped into a headbox where the slurry may or may not be combined with other slurries. Other additives may or may not be added. The slurry may also be diluted with additional water such that the final concentration of fiber is in a suitable range, such as for example, between about 0.1% and 0.5% by weight.

In some cases, the pH of the fiber slurry may be adjusted as desired. For instance, fibers of the slurry may be dispersed under acidic or neutral conditions.

Before the slurry is sent to a headbox, the slurry may optionally be passed through centrifugal cleaners and/or pressure screens for removing unfiberized material. The slurry may or may not be passed through additional equipment such as refiners or deflakers to further enhance the dispersion of the fibers. For example, deflakers may be useful to smooth out or remove lumps or protrusions that may arise at any point during formation of the fiber slurry. Fibers may then be collected on to a screen or wire at an appropriate rate using any suitable equipment, e.g., a fourdrinier, a rotoformer, a cylinder/round former, or an inclined wire fourdrinier.

As described herein, in some embodiments, a binder resin, which may optionally contain one or more chemical additives, is added to a pre-formed fiber layer (e.g., a pre-formed non-woven web formed by a wet-laid process). For instance, as the fiber layer is passed along an appropriate screen or wire, different components included in the binder resin (e.g., chemical additives, inorganic particles, rubber), which may be in the form of separate emulsions, are added to the fiber layer using a suitable technique. In some cases, each component of the binder resin is mixed as an emulsion prior to being combined with the other components and/or fiber layer. The components included in the resin may be pulled through the fiber layer using, for example, gravity and/or vacuum. In some embodiments, one or more of the components included in the binder resin may be diluted with softened water and pumped into the fiber layer. In some embodiments, a resin may be applied to a fiber slurry prior to introducing the slurry into a headbox. For example, the resin may be introduced (e.g., injected) into the fiber slurry and impregnated with and/or precipitated on to the fibers.

During or after formation of a non-woven web, the non-woven web may be further processed according to a variety of known techniques. Optionally, additional layers can be formed and/or added to a non-woven web using processes such as lamination, co-pleating, or collation. For example, in some cases, two layers are formed into a composite article by a wet laid process, and the composite article is then combined with a third layer by any suitable process (e.g., lamination, co-pleating, or collation). It can be appreciated that a non-woven web or a composite article formed by the processes described herein may be suitably tailored not only based on the components of each fiber layer, but also according to the effect of using multiple fiber layers of varying properties in appropriate combination to form non-woven webs having the characteristics described herein.

In some embodiments, a non-woven web can be post-processed such as subjected to a shaping process as described herein.

EXAMPLES

The following examples are intended to illustrate certain embodiments of the present invention, but are not to be construed as limiting and do not exemplify the full scope of the invention.

Example 1

This example demonstrates the reduction in dendrite formation in batteries including a battery separator comprising a non-woven web including sodium sulfate salt in the non-woven web (e.g., prior to introduction of the separator into the battery), compared to a) a similar battery including a separator lacking the sulfate salt, but including sulfate ion in the electrolyte (water), and b) a conventional battery separator. This example also demonstrates the reduction in dendrite formation in batteries including a battery separator comprising a non-woven web including glass fibers and having a mean flow pore size of greater than 0.5 microns, compared to a conventional polyethylene battery separator having a relatively smaller mean flow pore size, regardless of whether the battery separators included or did not include sulfate salts in the non-woven web or in the electrolyte.

The non-woven webs of battery separator 1 contained about 20% glass fibers, about 20% polyester fibers, about 15% resin, and about 45% precipitated silica. The non-woven webs of battery separator 1 had a mean flow pore size of greater than 0.5 microns (e.g., ~2 microns). Various amounts of sodium sulfate were added to battery separator 1 (e.g., the non-woven web), and/or to the electrolyte (water). The non-woven webs of battery separator 2 included about 1% sodium sulfate, about 18.5% glass fibers, about 10% polyester fibers, about 14% resin, about 18% bi-component fiber, about 6% rubber, and about 32.5% precipitated silica. The conventional battery separator (i.e., battery separator 3) was an extruded (non-fibrous) polyethylene separator containing 40% precipitated silica, 45% polyethylene polymer, and 15% oil. The extruded (non-fibrous) polyethylene separator had a mean flow pore size of less than 0.3 microns (e.g., ~0.2 microns).

The battery separators were exposed to electroplating conditions and the breakdown voltage was determined as described herein. The results are shown in table 1.

TABLE 1

| Breakdown Voltage for Various Battery Separators | | | | | | | | | | |
|---|---|---|---|---|---|---|---|---|---|---|
| | Separator | | | | | | | | | |
| | 3 | 3 | 1 | 1 | 1 | 1 | 1 | 1 | 2 | 2 |
| $Na_2SO_4$ in the separator in grams/cell | — | — | — | 0.024 | 0.06 | — | — | — | 0.12 | 0.12 |
| $Na_2SO_4$ in the water in gram/cell | — | 0.5 | — | — | — | 0.06 | 0.12 | 0.5 | — | 0.5 |
| % Loss in BDV | 88 | 82 | 70 | 78 | 33 | 85 | 47 | 25 | 28 | 0 |

The results show that addition of sodium sulfate to a fiber web is beneficial in preventing lead dendrite shorting. The results suggest that addition of sodium sulfate confined to the interior of the separator (separator 2) at a concentration of 0.12% is as effective as a direct addition of 0.5% sodium sulfate to the electrolyte (separator 1) in terms of a relatively low % loss in BDV. Moreover, when sodium sulfate was present in both the electrolyte and the non-woven web, there was no loss in breakdown voltage (separator 2).

The results also show that battery separators (separator 1) comprising a non-woven web including glass fibers and having a mean flow pore size of greater than 0.5 microns had less dendrite formation compared to a conventional polyethylene battery separator (separator 3) that had a smaller mean flow pore size (e.g., less than 0.3 microns). Regardless of whether battery separator 1 included or did not include sulfate salts in the non-woven web or in the electrolyte, the % loss in BDV for these separators were lower (e.g., 70% for a battery separator that did not include any sulfate salts in the non-woven web or in the electrolyte; 78% and 33% for battery separators including sulfate salts in the non-woven web; and 47% and 25% for battery separators including sulfate salts in the electrolyte), compared to the conventional polyethylene battery separator (separator 3 having 88% or 82% loss in BDV).

Example 2

This example demonstrates the reduction in water consumption in a battery separator including a non-woven web including rubber compared to a conventional battery separator comprising rubber. The battery separator including a non-woven web including rubber (i.e., battery separator 2 from Example 1) had a lower water consumption than a conventional extruded (non-fibrous) polyethylene separator comprising rubber (i.e., battery separator 3 from Example 1).

The water consumption of the battery separators were measured using 2V (75 Ah) cell including 5 positive lead dioxide electrodes and 6 negative lead electrodes. Positive electrode grids contained 2.5% antimony. The size of the electrode was 124 mm by 142 mm by 2.5 mm for the positive electrode and 124 mm by 142 mm by 2.2 mm for the negative electrode. The positive electrode weighed about 245 g and the negative electrode weighed about 210 g. The volume of sulfuric acid (1.27 g/cc density) in the cell was about 787 cm$^3$. The test was performed using test protocol IEC 60095. Briefly, the electrochemical cells were weighed prior to charging. Then the electrochemical cell was charged at 14.4V for a period of 500 hours at 40° C. The weight of the cells was noted at the end of the test.

TABLE 2

Water consumption for Various Battery Separators

| Separator details | Water consumption g/Ah |
| --- | --- |
| Battery separator 2 | 2.5 |
| Battery separator 3 | 3.3 |

Example 3

This example describes the mechanical and performance properties of a single-layer corrugated battery separator and multi-layer corrugated battery separators. Five multi-layer battery separators including a corrugated layer were formed that varied in the number and type of additional layers. The battery separators including the corrugated layer had increased total volume porosity and strength while maintaining a similar electrical resistance compared to a planar single layer battery separator.

The planar battery separator was a non-woven web that contained about 20% glass fibers, about 20% polyester fibers, about 15% resin, and about 45% precipitated silica.

The battery separator in Experiment A contained the corrugated version of the planar non-woven web that was bonded to additional layer 1. The planar layer was corrugated by passing the planar non-woven web between two heated corrugating rollers. The two rollers were arranged such that there was an inter-meshing of the teeth of the rollers which forced the layer into flutes. Additional layer 1 was a wet-laid non-woven web that contained about 24.5% glass fibers, about 15% polyester fibers, about 10% resin, and about 50.5% precipitated silica using acid resistant copolymer latex. Additional layer 1 had a basis weight of about 120 g/m$^2$ and thickness of about 0.3 mm.

In Experiment B, the battery separator contained the corrugated non-woven web of Experiment A bonded to additional layer 2. Additional layer 2 was a wet-laid glass mat comprising glass fibers and binder resin. The glass mat had a basis weight of 50 g/m$^2$ and a thickness of 0.4 mm at 3.5 kPa.

In Experiment C, the battery separator contained the corrugated non-woven web of Experiment A bonded on both sides to additional layer 1 used in Experiment A.

In Experiment D, the battery separator contained the corrugated non-woven web of Experiment A bonded on both sides to additional layer 2 used in Experiment B.

In Experiment E, the battery separator contained the corrugated non-woven web of Experiment A bonded on one side to additional layer 2 used in Experiment B and to additional layer 1 used in Experiment A on the other side.

Various properties of each of the battery separators is shown in Table 1.

TABLE 1

Properties of Various Battery Separators

| Test | Units | Planar Separator | A | B | C | D | E |
| --- | --- | --- | --- | --- | --- | --- | --- |
| Overall Thickness | Mm | 1.6 | 2.81 | 3.15 | 3.18 | 3.48 | 5.92 |
| Basis Wt. | g/m$^2$ | 230 | 313 | 280 | 454 | 311 | 781 |
| Apparent Density | g/m$^2$/mm | 143 | 111 | 88 | 143 | 88 | 131 |
| Total Porosity | % | 57 | 68 | 66 | 69 | 74 | 73 |
| Resistance | Ω · cm$^2$ | 0.1 | 0.102 | 0.113 | 0.124 | 0.105 | 0.185 |
| Resistance/Thickness | Ω · cm$^2$/mm | 0.063 | 0.036 | 0.036 | 0.039 | 0.030 | 0.031 |
| Puncture Strength | N | 7.99 | 11.54 | 10.64 | 16.44 | 17.7 | 21.64 |

Each of the battery separators including the corrugated layer had increased total volume porosity and puncture strength while having a similar electrical resistance as that for the planar single layer battery separator. Each of the battery separators from experiments A, B, D, and E had a lower apparent density than the planar single layer battery separator.

The invention claimed is:
1. A battery separator, comprising:
   a non-woven web comprising:
   a plurality of glass fibers having an average diameter of greater than or equal to about 0.1 microns and less than or equal to about 15 microns, wherein the glass fibers are present in an amount of greater than or equal to about 2 wt. % and less than or equal to about 95 wt. % of the non-woven web;

a plurality of inorganic particles, wherein the inorganic particles are resistant to sulfuric acid, wherein the inorganic particles are present in an amount of greater than or equal to about 30 wt. % and less than or equal to about 60 wt. % of the non-woven web, and wherein the inorganic particles have a surface area of greater than or equal to about 10 m$^2$/g and less than or equal to about 2,000 m$^2$/g; and one or more sulfate salts, wherein the one or more sulfate salts are present in an amount of greater than or equal to about 0.1 wt. % and less than or equal to 30 wt. % of the battery separator prior to contact with a battery electrolyte.

2. A battery separator, comprising:
a non-woven web comprising:
a plurality of glass fibers having an average diameter of greater than or equal to about 0.1 microns and less than or equal to about 15 microns, wherein the glass fibers are present in an amount of greater than or equal to about 2 wt. % and less than or equal to about 95 wt. % of the non-woven web; and
one or more antioxidants, wherein the one or more antioxidants are present in an amount of greater than or equal to about 0.05 wt. % and less than or equal to about 5 wt. % of the battery separator.

3. A battery separator, comprising:
a non-woven web comprising:
a plurality of glass fibers having an average diameter of greater than or equal to about 0.1 microns and less than or equal to about 15 microns, wherein the glass fibers are present in an amount of greater than or equal to about 2 wt. % and less than or equal to about 95 wt. % of the non-woven web;
a plurality of synthetic fibers, wherein the synthetic fibers are present in an amount of greater than or equal to about 1 wt. % and less than or equal to about 80 wt. % of the non-woven web;
a plurality of inorganic particles, wherein the inorganic particles are resistant to sulfuric acid, and wherein the inorganic particles are present in the non-woven web in an amount of greater than or equal to about 10 wt. % and less than or equal to about 80 wt. % of the non-woven web, and wherein the inorganic particles have a surface area of greater than or equal to about 10 m$^2$/g and less than or equal to about 2,000 m$^2$/g; and
one or more rubbers, wherein the one or more rubbers are present in the battery separator in an amount of greater than or equal to about 3 wt. % and less than or equal to about 80 wt. % of the battery separator.

4. A battery separator, comprising:
a non-woven web comprising:
a plurality of glass fibers having an average diameter of greater than or equal to about 0.1 microns and less than or equal to about 15 microns, wherein the glass fibers are present in an amount of greater than or equal to about 2 wt. % and less than or equal to about 100 wt. % of the non-woven web; and
a plurality of inorganic particles, wherein the inorganic particles are resistant to sulfuric acid, wherein the inorganic particles are present in an amount of greater than or equal to about 30 wt. % and less than or equal to about 60 wt. % of the non-woven web, and wherein the inorganic particles have a surface area of greater than or equal to about 10 m$^2$/g and less than or equal to about 2,000 m$^2$/g;

wherein the battery separator has a mean flow pore size of greater than or equal to about 0.5 microns and less than or equal to about 30 microns, and wherein the battery separator has a percent loss of breakdown voltage of less than or equal to about 80%.

5. A battery separator as in claim 1, wherein the non-woven web comprises a plurality of synthetic fibers, and wherein the synthetic fibers are present in an amount of greater than or equal to about 1 wt. % and less than or equal to about 80 wt. % of the non-woven web.

6. A battery separator as in claim 1, wherein the non-woven web comprises a plurality of synthetic fibers, and wherein the synthetic fibers are present in an amount of greater than or equal to about 5 wt. % and less than or equal to about 50 wt. % of the non-woven web.

7. A battery separator as in claim 1, wherein non-woven web further comprises a binder resin.

8. A battery separator as in claim 1, wherein the one or more sulfate salts are present in an amount of greater than or equal to about 0.5 wt. % and less than or equal to 5 wt. % of the non-woven web.

9. A battery separator as in claim 1, wherein the non-woven web comprises one or more antioxidants, and wherein the one or more antioxidants are present in an amount of greater than or equal to about 0.1 wt. % and less than or equal to about 1 wt. % of the non-woven web.

10. A battery separator as in claim 1, wherein the non-woven web comprises one or more rubbers, and wherein the one or more rubbers are present in an amount of greater than or equal to about 2 wt. % and less than or equal to about 20 wt. % of the non-woven web.

11. A battery separator as in claim 1, wherein a thickness of the battery separator is greater than or equal to about 0.1 mm and less than or equal to about 1 mm.

12. A battery separator as in claim 1, wherein a mean flow pore size of the battery separator is greater than or equal to about 0.2 microns and less than or equal to about 30 microns.

13. A battery separator as in claim 1, having a percent loss of breakdown voltage of less than or equal to about 80%.

14. A lead acid battery comprising the battery separator of claim 1.

15. A battery separator, comprising:
a non-woven web comprising:
a plurality of glass fibers having an average diameter of greater than or equal to about 0.1 microns and less than or equal to about 15 microns, wherein the glass fibers are present in an amount of greater than or equal to about 2 wt. % and less than or equal to about 95 wt. % of the non-woven web;
one or more antioxidants, wherein the one or more antioxidants are present in an amount of greater than or equal to about 0.1 wt. % and less than or equal to about 1 wt. % of the non-woven web; and
one or more sulfate salts, wherein the one or more sulfate salts are present in an amount of greater than or equal to about 0.1 wt. % and less than or equal to 30 wt. % of the battery separator prior to contact with a battery electrolyte.

16. A battery separator as in claim 3, comprising one or more antioxidants, wherein the one or more antioxidants are present in an amount of greater than or equal to about 0.1 wt. % and less than or equal to about 1 wt. % of the non-woven web.

17. A battery separator, comprising:
a non-woven web comprising:
a plurality of glass fibers having an average diameter of greater than or equal to about 0.1 microns and less than or equal to about 15 microns, wherein the glass fibers are present in an amount of greater than or equal to about 2 wt. % and less than or equal to about 100 wt. % of the non-woven web; and
one or more antioxidants, wherein the one or more antioxidants are present in an amount of greater than or equal to about 0.1 wt. % and less than or equal to about 1 wt. % of the non-woven web,
wherein the battery separator has a mean flow pore size of greater than or equal to about 0.5 microns and less than or equal to about 30 microns, and
wherein the battery separator has a percent loss of breakdown voltage of less than or equal to about 80%.

18. A battery separator as in claim 2, wherein the non-woven web comprises a plurality of synthetic fibers, and wherein the synthetic fibers are present in an amount of greater than or equal to about 1 wt. % and less than or equal to about 80 wt. % of the non-woven web.

19. A battery separator as in claim 2, wherein the non-woven web comprises a plurality of synthetic fibers, and wherein the synthetic fibers are present in an amount of greater than or equal to about 5 wt. % and less than or equal to about 50 wt. % of the non-woven web.

20. A battery separator as in claim 2, wherein the non-woven web further comprises a binder resin.

21. A battery separator as in claim 2, wherein the non-woven web comprises one or more sulfate salts, and wherein the one or more sulfate salts are present in an amount of greater than or equal to about 0.5 wt. % and less than or equal to 5 wt. % of the non-woven web.

22. A battery separator as in claim 2, wherein the one or more antioxidants are present in an amount of greater than or equal to about 0.1 wt. % and less than or equal to about 1 wt. % of the non-woven web.

23. A battery separator as in claim 2, wherein the non-woven web comprises one or more rubbers, and wherein the one or more rubbers are present in an amount of greater than or equal to about 2 wt. % and less than or equal to about 20 wt. % of the non-woven web.

24. A battery separator as in claim 2, wherein a thickness of the battery separator is greater than or equal to about 0.1 mm and less than or equal to about 1 mm.

25. A battery separator as in claim 2, wherein a mean flow pore size of the battery separator is greater than or equal to about 0.2 microns and less than or equal to about 30 microns.

26. A battery separator as in claim 2, having a percent loss of breakdown voltage of less than or equal to about 80%.

27. A lead acid battery comprising the battery separator of claim 2.

* * * * *